United States Patent
Zeng et al.

(10) Patent No.: US 12,412,892 B2
(45) Date of Patent: Sep. 9, 2025

(54) SECONDARY BATTERY AND ELECTRIC APPARATUS

(71) Applicant: CONTEMPORARY AMPEREX TECHNOLOGY (HONG KONG) LIMITED, Hong Kong (CN)

(72) Inventors: Chen Zeng, Ningde (CN); Meng Kang, Ningde (CN); Liangbin Liu, Ningde (CN); Libing He, Ningde (CN); Jiazheng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/038,200

(22) Filed: Jan. 27, 2025

(65) Prior Publication Data
US 2025/0174641 A1    May 29, 2025

Related U.S. Application Data

(63) Continuation of application No. PCT/CN2023/075710, filed on Feb. 13, 2023.

(51) Int. Cl.
*H01M 4/36*    (2006.01)
*H01M 4/48*    (2010.01)
(Continued)

(52) U.S. Cl.
CPC ............ *H01M 4/366* (2013.01); *H01M 4/48* (2013.01); *H01M 4/587* (2013.01);
(Continued)

(58) Field of Classification Search
None
See application file for complete search history.

(56) References Cited

U.S. PATENT DOCUMENTS

| | | | | |
|---|---|---|---|---|
| 2018/0097229 A1* | 4/2018 | Jo | ............ | H01M 4/364 |
| 2020/0365878 A1* | 11/2020 | Ishikawa | ............ | H01M 4/622 |
| 2021/0391572 A1* | 12/2021 | Zeng | ............ | H01M 4/134 |

FOREIGN PATENT DOCUMENTS

| | | |
|---|---|---|
| CN | 107069008 A | 8/2017 |
| CN | 107845785 A | 3/2018 |

(Continued)

OTHER PUBLICATIONS

International Search Report for PCT Application No. PCT/CN2023/075710, mailed Sep. 10, 2023 (6 pages).

*Primary Examiner* — Wyatt P Mcconnell
(74) *Attorney, Agent, or Firm* — K&L Gates LLP

(57) ABSTRACT

A secondary battery and an electric apparatus are disclosed. The secondary battery includes a negative electrode plate including a negative electrode current collector and a negative electrode film layer with a thickness of H; a first surface away from the negative electrode current collector; and a second surface opposite the first surface. A first region of the negative electrode film layer includes a first active material with a thickness range from the second surface of the negative electrode film layer to 0.3H. The first active material comprises a first silicon-based material, which comprises secondary particles formed by aggregation of primary particles. A second region of the negative electrode film layer comprises a second active material with a thickness range from the first surface of the negative electrode film layer to 0.3H.

19 Claims, 3 Drawing Sheets

(51) Int. Cl.
*H01M 4/587* (2010.01)
*H01M 10/0525* (2010.01)
*B60L 50/64* (2019.01)
*H01M 4/02* (2006.01)

(52) U.S. Cl.
CPC ......... *H01M 10/0525* (2013.01); *B60L 50/64* (2019.02); *H01M 2004/021* (2013.01); *H01M 2004/027* (2013.01); *H01M 2220/20* (2013.01)

(56) References Cited

FOREIGN PATENT DOCUMENTS

| | | | |
|---|---|---|---|
| CN | 108352519 | A | 7/2018 |
| CN | 111033823 | A | 4/2020 |
| CN | 111640913 | A | 9/2020 |
| CN | 111816839 | A | 10/2020 |
| KR | 1020190101651 | A | 9/2019 |
| WO | 2021217639 | A1 | 11/2021 |

* cited by examiner

SECONDARY BATTERY AND ELECTRIC APPARATUS

CROSS-REFERENCE TO RELATED APPLICATIONS

This application is a continuation of International Patent Application No. PCT/CN2023/075710, filed on Feb. 13, 2023, which is incorporated herein by reference in its entirety.

TECHNICAL FIELD

This application pertains to the field of battery technologies, and specifically, relates to a secondary battery and an electric apparatus.

BACKGROUND

In recent years, secondary batteries have been widely used in energy storage power supply systems such as hydroelectric, thermal, wind, and solar power plants, and many other fields including electric tools, electric bicycles, electric motorcycles, electric vehicles, military equipment, and aerospace. As the application range of secondary batteries becomes increasingly more extensive, people have posed a severe challenge to the performance of secondary batteries. For example, secondary batteries are required to have both high energy density and short charging time. However, the problem currently faced is that when the energy density of the secondary battery is increased, the charging time of the secondary battery is often prolonged.

SUMMARY

This application provides a secondary battery and an electric apparatus, which can enable the secondary battery to have both high energy density and good fast charge performance.

A first aspect of this application provides a secondary battery, including a negative electrode plate, where the negative electrode plate includes a negative electrode current collector and a negative electrode film layer, the negative electrode film layer has a first surface far away from the negative electrode current collector and a second surface arranged opposite the first surface, the negative electrode film layer has a thickness denoted as H, a region within a thickness range from the second surface of the negative electrode film layer to 0.3H is denoted as a first region of the negative electrode film layer, and a region within a thickness range from the first surface of the negative electrode film layer to 0.3H is denoted as a second region of the negative electrode film layer.

The first region includes a first active material, and the second region includes a second active material. The first active material includes a first silicon-based material, and the first silicon-based material includes secondary particles formed by aggregation of primary particles.

In the negative electrode plate of this application, the first active material in the first region of the negative electrode film layer includes a silicon-based material of secondary particles, which can improve the pore structure of the first region of the negative electrode film layer, enhance the wettability and retention characteristics of the negative electrode film layer with respect to the electrolyte solution, and enable ions to be quickly transported to the surface of the first active material particles; and in addition, the silicon-based material being the secondary particles can provide more ion intercalation channels, which is also conducive to the rapid diffusion of ions from the surface layer of the particles to the bulk phase. Therefore, the negative electrode plate of this application is conducive to improving the fast charge performance of secondary batteries with high energy density and achieving the ultra-fast charge goal. In addition, the first active material includes a silicon-based material of secondary particles, and the silicon-based material being the secondary particles has poor compressive resistance. Thus, improving the structure of the negative electrode film layer can reduce the damage to the particle structure of the silicon-based material being the secondary particles by the rolling pressure, thereby giving full play to the advantage of the high capacity of the first silicon-based material. Therefore, the negative electrode plate of this application can enable the secondary battery to have both high energy density and good fast charge performance.

In any embodiment of this application, a proportion of the first silicon-based material being the secondary particles in the first silicon-based material by number (e.g., a count/quantity of the number of particles) is ≥55%, and, in some embodiments, 60% to 85%. This is beneficial for the secondary battery to have both good fast charge performance and good cycling performance.

In any embodiment of this application, the first active material includes a first carbon-based material, which can improve the electronic conductivity of the negative electrode film layer, thereby enabling the secondary battery to have good cycling performance while improving the fast charge performance and energy density of the secondary battery.

In any embodiment of this application, the first carbon-based material has no carbon enveloping layer on its surface.

In any embodiment of this application, the first carbon-based material includes secondary particles formed by aggregation of primary particles.

In any embodiment of this application, a proportion of the first carbon-based material being the secondary particles in the first carbon-based material by number is ≥65%, and, in some embodiments, 70% to 95%. This is beneficial for the secondary battery to have both good fast charge performance and good cycling performance.

In any embodiment of this application, a particle size by volume $D_v50$ of the first carbon-based material is 12 μm to 18 μm, and, in some embodiments, 14 μm to 16 μm. With the particle size by volume $D_v50$ of the first carbon-based material falling within the foregoing range, it is favorable to improve the transport performance of ions and electrons, thereby further improving the fast charge performance of the secondary battery. In addition, it can also reduce the specific surface area of the first carbon-based material and reduce side reactions, thereby further improving the cycling performance of the secondary battery.

In any embodiment of this application, a particle size by volume $D_v90$ of the first carbon-based material is 24 μm to 30 μm, and, in some embodiments, 25 μm to 29 μm. With the particle size by volume $D_v90$ of the first carbon-based material falling within the foregoing range, the first carbon-based material particles have good consistency, which is conducive to improving the transport performance of ions and electrons, thereby further improving the fast charge performance of the secondary battery.

In any embodiment of this application, the first carbon-based material meets $(D_v90-D_v10)/D_v50$ being 0.8 to 1.6, and, in some embodiments, being 1.0 to 1.3. With $(D_v90-D_v10)/D_v50$ of the first carbon-based material falling within the foregoing range, it is favorable for the first region of the negative electrode film layer to have a suitable pore structure, thereby reducing the difficulty of ion liquid phase transport and further improving the fast charge performance of the secondary battery; and in addition, the first carbon-based material also has good particle stacking performance, which helps increase the compacted density of the negative electrode film layer, thereby further increasing the energy density of the secondary battery.

In any embodiment of this application, a specific surface area of the first carbon-based material is 2.0 m$^2$/g to 4.0 m$^2$/g, and, in some embodiments, 2.5 m$^2$/g to 3.1 m$^2$/g. With the specific surface area of the first carbon-based material falling within the foregoing range, the ion intercalation channels in the first region of the negative electrode film layer can be increased, which is favorable for the rapid diffusion of ions from the particle surface to the bulk phase, thereby further optimizing the fast charge performance of the secondary battery. In addition, with the specific surface area of the first carbon-based material falling within the foregoing range, it is conducive to reducing side reactions, thereby also enabling the secondary battery to have good cycling performance.

In any embodiment of this application, a powder compacted density of the first carbon-based material under 20000 N is 1.8 g/cm$^3$ to 2.0 g/cm$^3$, and, in some embodiments, 1.85 g/cm$^3$ to 1.95 g/cm$^3$. With the powder compacted density of the first carbon-based material falling within the foregoing range, the compacted density of the negative electrode film layer can be increased, thereby further increasing the energy density of the secondary battery; and it is also favorable for the first region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In any embodiment of this application, a tap density of the first carbon-based material is 0.9 g/cm$^3$ to 1.1 g/cm$^3$, and, in some embodiments, 0.95 g/cm$^3$ to 1.05 g/cm$^3$. With the tap density of the first carbon-based material falling within the foregoing range, the compacted density of the negative electrode film layer can be increased, thereby further increasing the energy density of the secondary battery; and it is also favorable for the first region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In any embodiment of this application, a degree of graphitization of the first carbon-based material is ≥93%, and, in some embodiments, 93% to 95%. With the degree of graphitization of the first carbon-based material falling within the foregoing range, it helps improve the ion transport performance of the negative electrode film layer, so that the secondary battery can have both high energy density and good fast charge performance.

In any embodiment of this application, a gram volume of the first carbon-based material is ≥355 mAh/g, and, in some embodiments, 357 mAh/g to 364 mAh/g. With the gram volume of the first carbon-based material falling within the foregoing range, the energy density of the secondary battery can be increased, and the first carbon-based material can also be enabled to have good ion transport performance, which also helps improve the fast charge performance of the secondary battery.

In any embodiment of this application, a powder oxygen index (OI) value of the first carbon-based material is 3 to 10, and, in some embodiments, 5 to 8. The first carbon-based material has a relatively small powder OI value, so can quickly receive ions from the positive electrode, thereby further improving the fast charge performance of the secondary battery.

In any embodiment of this application, the particle size by volume $D_v50$ of the first carbon-based material is denoted as A in m, the specific surface area of the first carbon-based material is denoted as B in m$^2$/g, and A/B is 4 to 11, and, in some embodiments, 5 to 7. By adjusting A/B within the foregoing range, the ion intercalation channels in the negative electrode film layer can be increased, which is favorable for the rapid diffusion of ions from the particle surface to the bulk phase, thereby further optimizing the fast charge performance of the secondary battery. In addition, it is also conducive to reducing side reactions, thereby also enabling the secondary battery to have good cycling performance.

In any embodiment of this application, the first carbon-based material includes graphite, and, in some embodiments, the graphite includes artificial graphite.

In any embodiment of this application, a proportion of the first carbon-based material in the first active material by mass is ≥50%, and, in some embodiments, 60% to 98%. By adjusting the proportion of the first carbon-based material within the foregoing range, the electronic conductivity of the negative electrode film layer can be improved, thereby improving the fast charge performance of the secondary battery while also achieving good cycling performance of the secondary battery.

In any embodiment of this application, the first active material includes a first carbon-based material, the second active material includes a second carbon-based material, the first carbon-based material includes secondary particles formed by aggregation of primary particles, and the second carbon-based material includes secondary particles formed by aggregation of primary particles.

In any embodiment of this application, a proportion of the second carbon-based material being the secondary particles in the second carbon-based material by number is less than the proportion of the first carbon-based material being the secondary particles in the first carbon-based material by number. By adjusting the proportion of the second carbon-based material being the secondary particles in the second carbon-based material by number to be less than the proportion of the first carbon-based material being the secondary particles in the first carbon-based material by number, it helps reduce side reactions and improve the cycling performance of the secondary battery.

In any embodiment of this application, a particle size by volume $D_v50$ of the second carbon-based material is less than a particle size by volume $D_v50$ of the first carbon-based material. By controlling the particle size by volume $D_v50$ of the second carbon-based material to be less than the particle size by volume $D_v50$ of the first carbon-based material, the second region and the first region of the negative electrode film layer can have an ideal compacted density difference, so that the pore distribution in the thickness direction of the negative electrode film layer better matches the ion concentration distribution, which helps improve the wettability and retention characteristics of the negative electrode film layer with respect to the electrolyte solution and is favorable for ion transport, thereby enabling the secondary battery to have both good fast charge performance and cycling performance.

In any embodiment of this application, a specific surface area of the second carbon-based material is less than a specific surface area of the first carbon-based material. By controlling the specific surface area of the second carbon-based material to be less than the specific surface area of the first carbon-based material, it helps reduce side reactions, thereby enabling the secondary battery to have both good fast charge performance and cycling performance.

In any embodiment of this application, a powder compacted density of the second carbon-based material under 20000 N is less than a powder compacted density of the first carbon-based material under 20000 N. By controlling the powder compacted density of the second carbon-based material at 20000 N to be less than the powder compacted density of the first carbon-based material at 20000 N, the second region and the first region of the negative electrode film layer can have a good pore distribution that better matches the concentration distribution of ions in the thickness direction of the negative electrode film layer, which reduces the difficulty of ion liquid phase transport and improves the wettability and retention characteristics of the negative electrode film layer with respect to the electrolyte solution, thereby enabling the secondary battery to have both good fast charge performance and cycling performance.

In any embodiment of this application, a tap density of the second carbon-based material is greater than a tap density of the first carbon-based material. By controlling the tap density of the second carbon-based material to be greater than the tap density of the first carbon-based material, the second region of the negative electrode film layer can have both good fast charge performance and high energy density.

In any embodiment of this application, a degree of graphitization of the second carbon-based material is lower than a degree of graphitization of the first carbon-based material. By adjusting the degree of graphitization of the second carbon-based material to be lower than the degree of graphitization of the first carbon-based material, it is favorable for the secondary battery to have both high energy density and good fast charge performance.

In any embodiment of this application, a gram volume of the second carbon-based material is less than a gram volume of the first carbon-based material. By adjusting the gram volume of the second carbon-based material to be less than the gram volume of the first carbon-based material, it is favorable for the secondary battery to have both high energy density and good fast charge performance.

In any embodiment of this application, a powder OI value of the second carbon-based material is less than a powder OI value of the first carbon-based material. By adjusting the powder OI value of the second carbon-based material to be less than the powder OI value of the first carbon-based material, it is favorable for rapid deintercalation of ions, thereby enabling the secondary battery to have better fast charge performance.

In any embodiment of this application, the second carbon-based material includes secondary particles formed by aggregation of primary particles, and a proportion of the second carbon-based material of secondary particles in the second carbon-based material by number is ≥60%, and, in some embodiments, 65% to 90%. This is favorable for the secondary battery to better have both good fast charge performance and good cycling performance.

In any embodiment of this application, the second carbon-based material has a carbon enveloping layer on its surface, and, in some embodiments, the carbon enveloping layer includes hard carbon. The presence of the carbon enveloping layer may increase the ion diffusion channels, which helps further optimize the fast charge performance of the secondary battery.

In any embodiment of this application, a particle size by volume $D_v50$ of the second carbon-based material is 10 μm to 17 μm, and, in some embodiments, 13 μm to 15 μm.

In any embodiment of this application, a particle size by volume $D_v90$ of the second carbon-based material is 18 μm to 26 μm, and, in some embodiments, 21 μm to 25 μm.

With the particle size by volume $D_v50$ and/or $D_v90$ of the second carbon-based material falling within the foregoing range(s), it helps improve the transport performance of ions and electrons, thereby further improving the fast charge performance of the secondary battery.

In any embodiment of this application, the second carbon-based material meets $(D_v90-D_v10)/D_v50$ being 0.6 to 1.4, and, in some embodiments, being 0.8 to 1.2. With $(D_v90-D_v10)/D_v50$ of the second carbon-based material falling within the foregoing range, it is favorable for the second region of the negative electrode film layer to have a suitable pore structure, thereby reducing the difficulty of ion liquid phase transport and further improving the fast charge performance of the secondary battery; and in addition, the second carbon-based material also has good particle stacking performance, which helps increase the compacted density of the negative electrode film layer, thereby further increasing the energy density of the secondary battery.

In any embodiment of this application, a specific surface area of the second carbon-based material is 1.5 $m^2$/g to 3.0 $m^2$/g, and, in some embodiments, 1.8 $m^2$/g to 2.5 $m^2$/g. With the specific surface area of the second carbon-based material falling within the foregoing range, the ion intercalation channels in the negative electrode film layer can be increased, which is favorable for the rapid diffusion of ions from the particle surface to the bulk phase, thereby further optimizing the fast charge performance of the secondary battery. In addition, with the specific surface area of the second carbon-based material falling within the foregoing range, it is conducive to reducing side reactions, thereby also enabling the secondary battery to have better cycling performance.

In any embodiment of this application, a powder compacted density of the second carbon-based material under 20000 N is 1.65 $g/cm^3$ to 1.85 $g/cm^3$, and, in some embodiments, 1.70 $g/cm^3$ to 1.80 $g/cm^3$. With the powder compacted density of the second carbon-based material falling within the foregoing range, the compacted density of the negative electrode film layer can be increased, thereby further increasing the energy density of the secondary battery; and it is also favorable for the second region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In any embodiment of this application, a tap density of the second carbon-based material is 1.0 $g/cm^3$ to 1.2 $g/cm^3$, and, in some embodiments, 1.05 $g/cm^3$ to 1.15 $g/cm^3$. With the tap density of the second carbon-based material falling within the foregoing range, the compacted density of the negative electrode film layer can be increased, thereby further increasing the energy density of the secondary battery; and it is also favorable for the second region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In any embodiment of this application, a degree of graphitization of the second carbon-based material is ≥91%, and, in some embodiments, 92% to 94%. With the degree of graphitization of the second carbon-based material falling within the foregoing range, it helps improve the ion transport performance of the negative electrode film layer, so that the secondary battery can have both high energy density and good fast charge performance.

In any embodiment of this application, a gram volume of the second carbon-based material is ≥352 mAh/g, and, in some embodiments, 355 mAh/g to 359 mAh/g. With the gram volume of the second carbon-based material falling within the foregoing range, the energy density of the secondary battery can be increased, and the second carbon-based material can also be enabled to have good ion transport performance, which also helps improve the fast charge performance of the secondary battery.

In any embodiment of this application, a powder OI value of the second carbon-based material is 2 to 8, and, in some embodiments, 3 to 6. The second carbon-based material has a relatively small powder OI value, so can quickly receive ions from the positive electrode, thereby further improving the fast charge performance of the secondary battery.

In any embodiment of this application, the particle size by volume $D_v50$ of the second carbon-based material is denoted as C in m, the specific surface area of the second carbon-based material is denoted as D in $m^2/g$, and C/D is 3 to 9, and, in some embodiments, 4 to 6. By adjusting C/D within the foregoing range, the ion intercalation channels in the negative electrode film layer can be increased, which is favorable for the rapid diffusion of ions from the surface of the second carbon-based material particles to the bulk phase, thereby further optimizing the fast charge performance of the secondary battery. In addition, it is also conducive to reducing side reactions, thereby also enabling the secondary battery to have better cycling performance.

In any embodiment of this application, the second carbon-based material includes graphite, and, in some embodiments, the graphite includes artificial graphite.

In any embodiment of this application, a proportion of the second carbon-based material in the second active material by mass is ≥70%, and, in some embodiments, 75% to 95%. This helps improve the fast charge performance of the secondary battery.

In any embodiment of this application, a porosity of the first silicon-based material being the secondary particles is ≥4%, and, in some embodiments, 5% to 20%. Further adjusting the porosity of the first silicon-based material being the secondary particles helps further optimize the fast charge performance of the secondary battery.

In any embodiment of this application, a particle size by volume $D_v50$ of the first silicon-based material is 8 μm to 15 μm, and, in some embodiments, 10 μm to 13 μm.

In any embodiment of this application, a particle size by volume $D_v90$ of the first silicon-based material is 15 μm to 25 μm, and, in some embodiments, 16 μm to 24 μm.

With the particle size by volume $D_v50$ and/or $D_v90$ of the first silicon-based material falling within the foregoing range(s), the ion intercalation channels in the negative electrode film layer can be increased, which is favorable for the rapid diffusion of ions from the particle surface to the bulk phase, thereby further optimizing the fast charge performance of the secondary battery.

In any embodiment of this application, the first silicon-based material meets $(D_v90-D_v10)/D_v50$ being 0.7 to 1.5, and, in some embodiments, being 0.9 to 1.3. With $(D_v90-D_v10)/D_v50$ of the first silicon-based material falling within the foregoing range, it is favorable for the first region of the negative electrode film layer to have a suitable pore structure, thereby reducing the difficulty of ion liquid phase transport and improving the fast charge performance of the secondary battery; and in addition, the first silicon-based material also has good particle stacking performance, which helps increase the compacted density of the negative electrode film layer, thereby further increasing the energy density of the secondary battery.

In any embodiment of this application, a specific surface area of the first silicon-based material is 0.7 $m^2/g$ to 2.0 $m^2/g$, and, in some embodiments, 0.8 $m^2/g$ to 1.6 $m^2/g$. With the specific surface area of the first silicon-based material falling within the foregoing range, the ion intercalation channels of the negative electrode film layer can be increased, which is favorable for the rapid diffusion of ions from the particle surface to the bulk phase, thereby further optimizing the fast charge performance of the secondary battery. In addition, with the specific surface area of the first silicon-based material falling within the foregoing range, it is conducive to reducing side reactions, thereby also enabling the secondary battery to have better cycling performance.

In any embodiment of this application, a powder compacted density of the first silicon-based material under 50000 N is 1.0 $g/cm^3$ to 1.7 $g/cm^3$, and, in some embodiments, 1.2 $g/cm^3$ to 1.6 $g/cm^3$. With the powder compacted density of the first silicon-based material falling within the foregoing range, the compacted density of the negative electrode film layer can be increased, thereby further increasing the energy density of the secondary battery; and it is also favorable for the first region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In any embodiment of this application, a tap density of the first silicon-based material is 1.0 $g/cm^3$ to 1.5 $g/cm^3$, and, in some embodiments, 1.1 $g/cm^3$ to 1.4 $g/cm^3$. With the tap density of the first silicon-based material falling within the foregoing range, the compacted density of the negative electrode film layer can be increased, thereby further increasing the energy density of the secondary battery; and it is also favorable for the first region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In any embodiment of this application, a powder resistivity of the first silicon-based material under 4 MPa is ≤15

Ω·cm, and, in some embodiments, 0.5 Ω·cm to 12 Ω·cm. By adjusting the powder resistivity of the first silicon-based material within the foregoing range, the electronic conductivity of the negative electrode film layer can be improved, and the fast charge performance of the secondary battery can be further improved.

In any embodiment of this application, a proportion of the first silicon-based material in the first active material by mass is ≤50%, and, in some embodiments, 2% to 40%. By adjusting the proportion of the first silicon-based material within the foregoing range, the secondary battery can have improved fast charge performance and energy density, and the secondary battery can also have good cycling performance.

In any embodiment of this application, the first silicon-based material includes one or more of elemental silicon, silicon oxide, silicon-carbon material, and silicon alloy material, and, in some embodiments, the first silicon-based material includes secondary particles formed by aggregation of at least one of the following primary particles: silicon oxide material primary particles containing neither alkali metal nor alkaline earth metal, silicon oxide material primary particles containing either alkali metal or alkaline earth metal, silicon-carbon material primary particles, elemental silicon primary particles, and silicon alloy primary particles.

In any embodiment of this application, the second active material includes a second silicon-based material, which can further increase the energy density of the secondary battery.

In any embodiment of this application, the second silicon-based material includes one or more of primary particles and secondary particles formed by aggregation of primary particles, and, in some embodiments, includes primary particles.

In any embodiment of this application, the second silicon-based material includes primary particles, and a proportion of the second silicon-based material being the primary particles in the second silicon-based material by number is ≥60%, and, in some embodiments, 65% to 95%. When the second silicon-based material is mainly primary particles, it helps reduce the probability of particle breakage and increase the compacted density of the negative electrode film layer, thereby further increasing the energy density of the secondary battery.

In any embodiment of this application, a proportion of the second silicon-based material in the second active material by mass is less than a proportion of the first silicon-based material in the first active material by mass. By controlling the proportion of the second silicon-based material in the second active material by mass to be less than the proportion of the first silicon-based material in the first active material by mass, side reactions can be reduced, thereby facilitating the secondary battery to have better cycling performance.

In any embodiment of this application, a particle size by volume $D_v50$ of the second silicon-based material is less than a particle size by volume $D_v50$ of the first silicon-based material. By adjusting the particle size by volume $D_v50$ of the second silicon-based material to be less than the particle size by volume $D_v50$ of the first silicon-based material, the probability of particle breakage of the second silicon-based material can be reduced, the electronic conductivity of the second silicon-based material can be increased, and the ion intercalation channel of the negative electrode film layer can be increased, thereby enabling the secondary battery to have both high energy density and good fast charge performance.

In any embodiment of this application, a specific surface area of the second silicon-based material is less than a specific surface area of the first silicon-based material. When the specific surface area of the second silicon-based material is less than the specific surface area of the first silicon-based material, it helps reduce side reactions, thereby facilitating the secondary battery to have better cycling performance.

In any embodiment of this application, a powder compacted density of the second silicon-based material under 50000 N is greater than a powder compacted density of the first silicon-based material under 50000 N. By adjusting the powder compacted density of the second silicon-based material to be greater than the powder compacted density of the first silicon-based material, it helps increase the energy density of the secondary battery and improve the cycling performance of the secondary battery.

In any embodiment of this application, a tap density of the second silicon-based material is greater than a tap density of the first silicon-based material. By adjusting the tap density of the second silicon-based material to be greater than the tap density of the first silicon-based material, it helps increase the energy density of the secondary battery and improve the cycling performance of the secondary battery.

In any embodiment of this application, a powder resistivity of the second silicon-based material under 4 MPa is less than a powder resistivity of the first silicon-based material under 4 MPa. By adjusting the powder resistivity of the second silicon-based material to be less than the powder resistivity of the first silicon-based material, it helps improve the electronic conductivity of the negative electrode film layer, thereby further improving the fast charge performance of the secondary battery.

In any embodiment of this application, a particle size by volume $D_v50$ of the second silicon-based material is 4 μm to 12 μm, and, in some embodiments, 5 μm to 11 μm.

In any embodiment of this application, a particle size by volume $D_v90$ of the second silicon-based material is 8 μm to 18 μm, and, in some embodiments, 9 μm to 17 μm.

With the particle size by volume $D_v50$ and/or $D_v90$ of the second silicon-based material falling within the foregoing range(s), the ion intercalation channels in the negative electrode film layer can be increased, which is favorable for the rapid diffusion of ions from the particle surface to the bulk phase, thereby further optimizing the fast charge performance of the secondary battery. In addition, the risk of breakage of the second silicon-based material particles can also be reduced.

In any embodiment of this application, the second silicon-based material meets $(D_v90-D_v10)/D_v50$ being 0.7 to 1.3, and, in some embodiments, being 0.8 to 1.2. With $(D_v90-D_v10)/D_v50$ of the second silicon-based material falling within the foregoing range, it is favorable for the second region of the negative electrode film layer to have a suitable pore structure, thereby reducing the difficulty of ion liquid phase transport and further improving the fast charge performance of the secondary battery; and in addition, the second silicon-based material may also have good particle stacking performance, which helps increase the compacted density of the negative electrode film layer, thereby further increasing the energy density of the secondary battery.

In any embodiment of this application, a specific surface area of the second silicon-based material is 0.6 $m^2/g$ to 1.6 $m^2/g$, and, in some embodiments, 0.7 $m^2/g$ to 1.5 $m^2/g$. With the specific surface area of the second silicon-based material falling within the foregoing range, the ion intercalation channels of the negative electrode film layer can be increased, which is favorable for the rapid diffusion of ions from the particle surface to the bulk phase, thereby further optimizing the fast charge performance of the secondary battery. In addition, with the specific surface area of the second silicon-based material falling within the foregoing range, it is conducive to reducing side reactions, thereby also enabling the secondary battery to have better cycling performance.

In any embodiment of this application, a powder compacted density of the second silicon-based material under 50000 N is 1.2 g/cm³ to 1.8 g/cm³, and, in some embodiments, 1.3 g/cm³ to 1.7 g/cm³. With the powder compacted density of the second silicon-based material falling within the foregoing range, the compacted density of the negative electrode film layer can be increased, thereby further increasing the energy density of the secondary battery; and it is also favorable for the second region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In any embodiment of this application, a tap density of the second silicon-based material is 1.1 g/cm³ to 1.7 g/cm³, and, in some embodiments, 1.2 g/cm³ to 1.6 g/cm³. With the tap density of the second silicon-based material falling within the foregoing range, the compacted density of the negative electrode film layer can be increased, thereby increasing the energy density of the secondary battery; and it is also favorable for the second region of the negative electrode film layer to have a suitable pore structure, which can further reduce the difficulty of ion liquid phase transport, improve transport performance of ions and electrons, and improve the wettability and retention characteristics of the negative electrode film layer with respect to the electrolyte solution, thereby further improving the fast charge performance and/or cycling performance of the secondary battery.

In any embodiment of this application, a powder resistivity of the second silicon-based material under 4 MPa is ≤5 $\Omega \cdot cm$, and, in some embodiments, 0.3 $\Omega \cdot cm$ to 4 $\Omega \cdot cm$. By adjusting the powder resistivity of the second silicon-based material within the foregoing range, the electronic conductivity of the negative electrode film layer can be improved, and the fast charge performance of the secondary battery can be further improved.

In any embodiment of this application, a proportion of the second silicon-based material in the second active material by mass is ≤30%, and, in some embodiments, ≤15%. By adjusting the proportion of the second silicon-based material within the foregoing range, the secondary battery can have improved fast charge performance and increased energy density, and the secondary battery can also have good cycling performance.

In any embodiment of this application, the second silicon-based material includes one or more of elemental silicon, silicon oxide, silicon-carbon material, and silicon alloy material.

In any embodiment of this application, an intermediate region located between the first region and the second region includes the first active material and/or the second active material.

In any embodiment of this application, a porosity of the negative electrode film layer is ≥18%, and, in some embodiments, 25% to 45%. This helps the negative electrode film layer to have both high capacity and suitable pore structure, which in turn helps the secondary battery to have both high energy density and good cycling performance and fast charge performance.

In any embodiment of this application, a compacted density of the negative electrode film layer is ≥1.5 g/cm³, and, in some embodiments, 1.6 g/cm³ to 1.8 g/cm³. This helps the negative electrode film layer to have both high capacity and good ion and electron transport performance, which in turn helps the secondary battery to have both high energy density and good cycling performance and fast charge performance.

In any embodiment of this application, a surface density of the negative electrode film layer is ≥7 mg/cm², and, in some embodiments, 12 mg/cm² to 30 mg/cm². This helps the negative electrode film layer to have both high capacity and good ion and electron transport performance, which in turn helps the secondary battery to have both high energy density and good cycling performance and fast charge performance.

A second aspect of this application provides an electric apparatus, including the secondary battery according to the first aspect of this application.

The electric apparatus in this application includes the secondary battery provided in this application, and therefore has at least advantages that are the same as those of the secondary battery.

BRIEF DESCRIPTION OF DRAWINGS

To describe the technical solutions in embodiments of this application more clearly, the following briefly describes the accompanying drawings required for describing the embodiments of this application. Apparently, the accompanying drawings in the following descriptions show merely some embodiments of this application, and persons of ordinary skill in the art may derive other drawings from these accompanying drawings without creative efforts.

Figure 1:
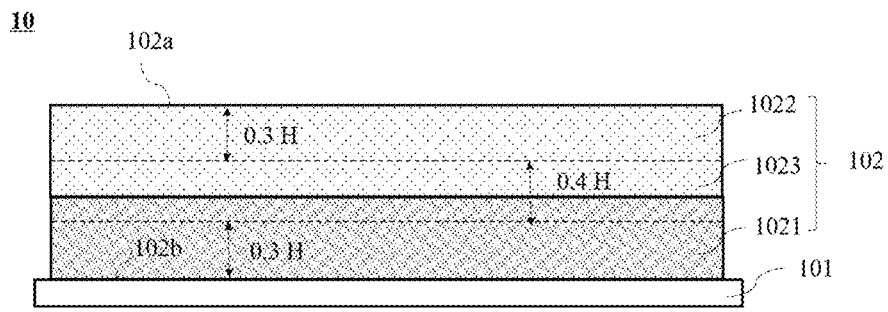
FIG. 1 is a schematic diagram of an embodiment of a negative electrode plate according to this application.

In the accompanying drawings, the figures are not necessarily drawn to scale. Reference signs are explained as follows: 1. battery pack; 2. upper box body; 3. lower box body; 4. battery module; 5. secondary battery; 51. housing; 52. electrode assembly; 53. cover plate; 10. negative electrode plate; 101. negative electrode current collector; 102. negative electrode film layer; 102a. first surface; 102b. second surface; 1021. first region; 1022. second region; and 1023. intermediate region.

DESCRIPTION OF EMBODIMENTS

The following specifically discloses in detail embodiments of the secondary battery and electric apparatus of this application, with appropriate reference to the accompanying drawings. However, there may be cases in which unnecessary detailed descriptions are omitted. For example, detailed descriptions of well-known matters and repeated descriptions of actually identical structures have been omitted. This is to avoid unnecessarily prolonging the following descriptions, for ease of understanding by persons skilled in the art. In addition, the accompanying drawings and the following descriptions are provided for those skilled in the art to fully understand this application and are not intended to limit the subject described in the claims.

"Ranges" disclosed in this application are defined in the form of lower and upper limits. A given range is defined by one lower limit and one upper limit selected, where the selected lower and upper limits define boundaries of that special range. Ranges defined in this way may or may not include end values, and any combination may be used, meaning that any lower limit may be combined with any upper limit to form a range. For example, if ranges of 60-120 and 80-110 are provided for a specific parameter, it is understood that ranges of 60-110 and 80-120 can also be envisioned. In addition, if low limit values of a range are given as 1 and 2, and upper limit values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein and "0-5" is just a short representation of combinations of these values. In addition, a parameter expressed as an integer greater than or equal to 2 is equivalent to disclosure that the parameter is, such as, an integer among 2, 3, 4, 5, 6, 7, 8, 9, 10, 11, 12, and so on.

Unless otherwise specified, all the embodiments of this application can be combined with each other to form new technical solutions, and such technical solutions should be considered to be included in the disclosure of this application.

Unless otherwise specified, all the technical features of this application can be combined with each other to form new technical solutions, and such technical solutions should be considered to be included in the disclosure of this application.

Unless otherwise specified, all the steps in this application can be performed in the order described or in random order, preferably, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise stated, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Unless otherwise specified, the terms used in this application have well-known meanings as commonly understood by persons skilled in the art.

Unless otherwise specified, numerical values of parameters mentioned in this application may be tested using various measurement methods commonly used in the art, for example, they may be tested using the measurement methods provided in this application. If not particularly specified, the temperature during the test is 25° C.

In this application, the term "a plurality of" means two or more than two and the term "a plurality of types" means two types or more than two types.

Energy density and fast charge performance are two key performance indicators of the secondary battery, but these two performances are usually contradictory. The high-energy-density battery usually requires high electrode plate compacted density, high film layer thickness, and low porosity, which usually hinders ion transport, thereby adversely affecting the fast charge performance of the secondary battery. Good fast charge performance usually requires sacrificing energy density. For example, it usually requires low electrode plate compacted density, low film layer thickness, and high porosity.

Therefore, how to make the high-energy-density battery also has good fast charge performance is a technical problem that urgently needs to be solved.

The negative electrode plate is an important component of the secondary battery, and its performance is crucial to the performance of the secondary battery. Currently, graphite is the most commonly used negative electrode active material, but the energy density of the secondary battery using it has approached the theoretical value. The silicon-based material has the advantage of high theoretical energy density, which can significantly increase the energy density of the secondary battery. However, the fast charge performance of the secondary battery is still relatively poor and needs further improvement.

In view of this, the inventors have ingeniously improved the composition of the negative electrode film layer, enabling the secondary battery to have both high energy density and good fast charge performance.

Specifically, an embodiment of this application provides a secondary battery.

The secondary battery is not specifically limited to any particular type in this application. For example, the secondary battery may be a lithium-ion battery. Usually, a secondary battery includes a positive electrode plate, a negative electrode plate, and an electrolyte. During charge and discharge of the secondary battery, ions are intercalated and deintercalated between the positive electrode plate and the negative electrode plate, and the electrolyte conducts the ions. The electrolyte is not specifically limited to any particular type in this application, and may be selected depending on actual needs. For example, the electrolyte may be selected from at least one of solid electrolyte and liquid electrolyte (namely, an electrolyte solution). A secondary battery using an electrolyte solution and some secondary batteries using a solid electrolyte may further include a separator, where the separator is arranged between the positive electrode plate and the negative electrode plate to mainly serve an isolation purpose.

[Negative Electrode Plate]

Figure 2:
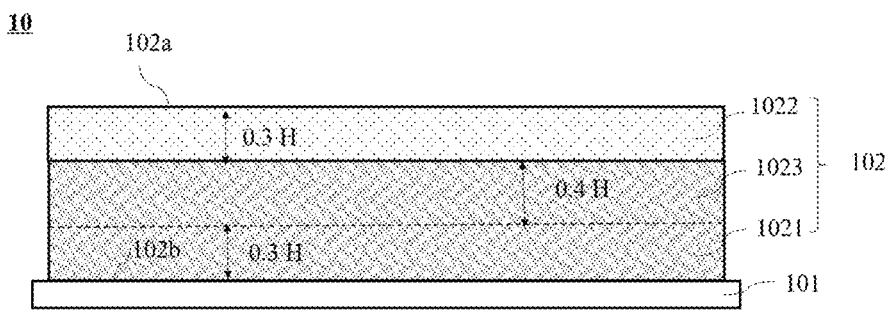
FIG. 2 is a schematic diagram of another embodiment of a negative electrode plate according to this application.
Figure 3:
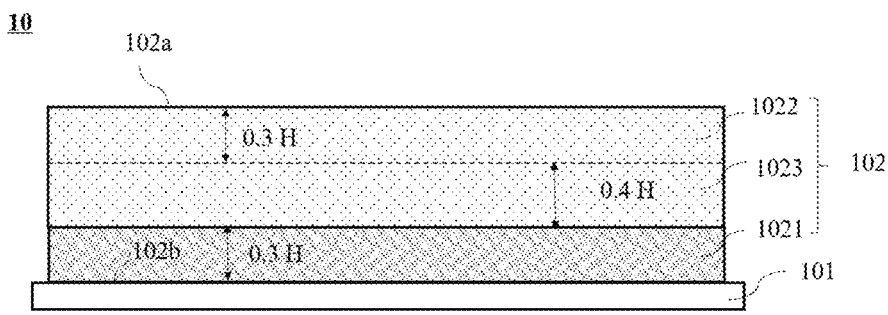
FIG. 3 is a schematic diagram of still another embodiment of a negative electrode plate according to this application.

FIG. 1 to FIG. 3 are schematic diagrams of an embodiment of a negative electrode plate according to this application.

As shown in FIG. 1 to FIG. 3, a negative electrode plate 10 includes a negative electrode current collector 101 and a negative electrode film layer 102 formed on at least one surface of the negative electrode current collector 101. The negative electrode film layer 102 has a first surface 102a far away from the negative electrode current collector 101 and a second surface 102b arranged opposite the first surface 102a. The negative electrode film layer 102 has a thickness of denoted as H. A region within a thickness range from the second surface 102b of the negative electrode film layer to 0.3H is denoted as a first region 1021 of the negative electrode film layer, and a region within a thickness range from the first surface 102a of the negative electrode film layer to 0.3H is denoted as a second region 1022 of the negative electrode film layer.

The first region 1021 includes a first active material, and the second region 1022 includes a second active material. The first active material includes a first silicon-based material, and the first silicon-based material includes secondary particles formed by aggregation of primary particles.

The thickness H of the negative electrode film layer is a thickness of the negative electrode film layer on one side of the negative electrode current collector.

In high-energy-density battery systems, ion liquid phase transport becomes a bottleneck restricting the fast charge performance of the secondary battery. A high-energy-density negative electrode plate is used as an example. The second region of the negative electrode film layer usually has a relatively high porosity, while the first region of the negative electrode film layer usually has a relatively low porosity. This results in greater liquid phase transport resistance for ions in the first region of the negative electrode film layer and more difficult wettability to the electrolyte solution, thereby affecting the kinetic performance of the negative electrode plate and the secondary battery, and making it difficult for the secondary battery to achieve the goal of ultra fast charge.

In the negative electrode plate of this application, the first active material in the first region of the negative electrode film layer includes a silicon-based material of secondary particles, which can improve the pore structure of the first region of the negative electrode film layer, enhance the wettability and retention characteristics of the negative electrode film layer with respect to the electrolyte solution, and enable ions to be quickly transported to the surface of the first active material particles; and in addition, the silicon-based material being the secondary particles can provide more ion intercalation channels, which is also conducive to the rapid diffusion of ions from the surface layer of the particles to the bulk phase. Therefore, the negative electrode plate of this application is conducive to improving the fast charge performance of secondary batteries with high energy density and achieving the ultra-fast charge goal.

In addition, the first active material includes a silicon-based material of secondary particles, and the silicon-based material being the secondary particles has poor compressive resistance. Thus, improving the structure of the negative electrode film layer can reduce the damage to the particle structure of the silicon-based material being the secondary particles by the rolling pressure, thereby giving full play to the advantage of the high capacity of the first silicon-based material.

Therefore, the negative electrode plate of this application can enable the secondary battery to have both high energy density and good fast charge performance.

In some embodiments, a proportion of the first silicon-based material being the secondary particles in the first silicon-based material by number is ≥55%, for example, ≥57.5%, ≥60%, ≥62.5%, or ≥65%. In high-energy-density battery systems, the first region of the negative electrode film layer often has a relatively low porosity and more difficult ion liquid phase transport. The first silicon-based material contains an appropriate proportion of secondary particles, which can improve the pore structure of the first region of the negative electrode film layer, thereby reducing the difficulty of ion liquid phase transport and improving the fast charge performance of the secondary battery. In addition, it is also favorable for the rapid transfer of ions to the surface of the first silicon-based material particles, so that the fast charge performance of the secondary battery is further optimized.

The inventors further found that the proportion of the first silicon-based material being the secondary particles in the first silicon-based material by number should not be too high. In this case, the secondary battery has more side reactions, which will affect the cycling performance of the secondary battery. Optionally, in some embodiments, the proportion of the first silicon-based material being the secondary particles in the first silicon-based material by number may be 55% to 90%, 60% to 90%, 65% to 90%, 55% to 85%, 60% to 85%, 65% to 85%, 55% to 80%, 60% to 80%, or 65% to 80%. This is beneficial for the secondary battery to have both good fast charge performance and good cycling performance.

In some embodiments, the first silicon-based material may also include primary particles (referring to particles in a non-agglomerated state herein), and the proportion of the first silicon-based material being the primary particles in the first silicon-based material by number may be ≤45%. The specific types of the first silicon-based material being the primary particles and the first silicon-based material being the secondary particles may be the same or may be different.

In some embodiments, a porosity of the first silicon-based material being the secondary particles may be ≥4%, and, in some embodiments, 5% to 20%. The inventors noticed in further research that further adjusting the porosity of the first silicon-based material being the secondary particles helps further optimize the fast charge performance of the secondary battery. With the porosity of the first silicon-based material being the secondary particles falling within the foregoing range, it helps improve the pore structure of the first region of the negative electrode film layer, improve the wettability and retention characteristics of the negative electrode film layer with respect to the electrolyte solution, thereby facilitating the acceleration of ion liquid phase transport speed; and it also helps increase the ion intercalation channels of the first silicon-based material, so that the ions quickly diffuse from the surface of the particles to the bulk phase, thereby facilitating further optimization of the fast charge performance of the secondary battery.

In some embodiments, a particle size by volume $D_v50$ of the first silicon-based material may be 8 μm to 15 μm, and, in some embodiments, 10 μm to 13 μm.

In some embodiments, a particle size by volume $D_v90$ of the first silicon-based material may be 15 μm to 25 μm, and, in some embodiments, 16 μm to 24 μm.

With the particle size by volume $D_v50$ and/or $D_v90$ of the first silicon-based material falling within the foregoing range(s), the ion intercalation channels in the negative electrode film layer can be increased, which is favorable for the rapid diffusion of ions from the particle surface to the bulk phase, thereby further optimizing the fast charge performance of the secondary battery.

In some embodiments, the first silicon-based material meets $(D_v90-D_v10)/D_v50$ being 0.7 to 1.5, and, in some embodiments, being 0.9 to 1.3. With $(D_v90-D_v10)/D_v50$ of the first silicon-based material falling within the foregoing range, it is favorable for the first region of the negative electrode film layer to have a suitable pore structure, thereby reducing the difficulty of ion liquid phase transport and improving the fast charge performance of the secondary battery; and in addition, the first silicon-based material also has good particle stacking performance, which helps increase the compacted density of the negative electrode film layer, thereby further increasing the energy density of the secondary battery.

In some embodiments, a specific surface area of the first silicon-based material may be 0.7 m²/g to 2.0 m²/g, and, in some embodiments, 0.8 m²/g to 1.6 m²/g. With the specific surface area of the first silicon-based material falling within the foregoing range, the ion intercalation channels of the negative electrode film layer can be increased, which is favorable for the rapid diffusion of ions from the particle surface to the bulk phase, thereby further optimizing the fast charge performance of the secondary battery. In addition, with the specific surface area of the first silicon-based material falling within the foregoing range, it is conducive to reducing side reactions, thereby also enabling the secondary battery to have better cycling performance.

In some embodiments, a powder compacted density of the first silicon-based material under 50000 N may be 1.0 g/cm³ to 1.7 g/cm³, and, in some embodiments, 1.2 g/cm³ to 1.6 g/cm³. With the powder compacted density of the first silicon-based material falling within the foregoing range, the compacted density of the negative electrode film layer can be increased, thereby further increasing the energy density of the secondary battery; and it is also favorable for the first region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In some embodiments, a tap density of the first silicon-based material may be 1.0 g/cm³ to 1.5 g/cm³, and, in some embodiments, 1.1 g/cm³ to 1.4 g/cm³. With the tap density of the first silicon-based material falling within the foregoing range, the compacted density of the negative electrode film layer can be increased, thereby further increasing the energy density of the secondary battery; and it is also favorable for the first region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In some embodiments, a powder resistivity of the first silicon-based material under 4 MPa may be ≤15 Ω·cm, and, in some embodiments, 0.5 Ω·cm to 12 Ω·cm. By adjusting the powder resistivity of the first silicon-based material within the foregoing range, the electronic conductivity of the negative electrode film layer can be improved, and the fast charge performance of the secondary battery can be further improved.

In some embodiments, a proportion of the first silicon-based material in the first active material by mass is ≤50%, and, in some embodiments, 2% to 40%, 2% to 30%, 2% to 20%, 2% to 15%, 3% to 40%, 3% to 30%, 3% to 20%, or 3% to 15%. By adjusting the proportion of the first silicon-based material within the foregoing range, the secondary battery can have improved fast charge performance and increased energy density, and the secondary battery can also have good cycling performance.

In some embodiments, the first silicon-based material may include one or more of elemental silicon, silicon oxide ($SiO_x$, $0<x≤2$), silicon-carbon material, and silicon alloy material. The silicon-carbon material is not specifically limited to any structure in this application. For example, high-energy ball milling may be used to disperse nano-silicon in a carbon material, disperse nano-silicon in porous carbon, disperse a carbon material in porous silicon, envelop a carbon material on the surface of nano-silicon, co-deposit nano-silicon and nano-carbon together.

In some embodiments, the first silicon-based material may include secondary particles formed by aggregation of at least one of the following primary particles: silicon oxide material primary particles containing neither alkali metal nor alkaline earth metal, silicon oxide material primary particles containing either alkali metal or alkaline earth metal, silicon-carbon material primary particles, elemental silicon primary particles, and silicon alloy primary particles. Optionally, the alkali metal may include Li. Optionally, the alkaline earth metal may include Mg. For example, the first silicon-based material may include secondary particles formed by aggregation of silicon oxide material primary particles containing neither alkali metal nor alkaline earth metal, secondary particles formed by aggregation of silicon oxide material primary particles containing neither alkali metal nor alkaline earth metal and silicon oxide material primary particles containing either alkali metal or alkaline earth metal, secondary particles formed by aggregation of silicon oxide material primary particles containing either alkali metal or alkaline earth metal, secondary particles formed by aggregation of silicon-carbon material primary particles, secondary particles formed by aggregation of silicon-carbon material primary particles and silicon oxide material primary particles containing neither alkali metal nor alkaline earth metal, and secondary particles formed by aggregation of silicon-carbon material primary particles and silicon oxide material primary particles containing either alkali metal or alkaline earth metal.

In some embodiments, the first silicon-based material has carbon enveloping layer on its surface. For example, the carbon enveloping layer may be arranged on the surface of elemental silicon, silicon oxide, or the like, to improve the electronic conductivity of the first silicon-based material and reduce the powder resistivity of the first silicon-based material. The powder resistivity of the first silicon-based material may be adjusted by adjusting parameters such as the thickness of the carbon enveloping layer and the degree of graphitization.

Certainly, the first silicon-based material may also have no carbon enveloping layer on its surface. For example, the powder resistivity of the first silicon-based material may be adjusted by adjusting parameters such as the structure of the silicon-carbon material and the percentage of element carbon.

The carbon enveloping layer on the surface of the first silicon-based material may be formed through chemical vapor deposition, pyrolysis, hydrothermal method, and the like.

In some embodiments, the first active material may further include a first carbon-based material, which can improve the electronic conductivity of the negative electrode film layer, thereby enabling the secondary battery to have good cycling performance while improving the fast charge performance and energy density of the secondary battery.

In some embodiments, the first carbon-based material may have no carbon enveloping layer on its surface.

In some embodiments, the first carbon-based material may include secondary particles formed by aggregation of primary particles.

In any embodiment of this application, the first carbon-based material may include secondary particles formed by aggregation of primary particles, and the secondary particles have no carbon enveloping layer on its surface. At high surface density, ion liquid phase diffusion impedance is dominant, and the carbon enveloping layer has little effect on further improving the fast charge performance of the first carbon-based material being the secondary particles; and in addition, the main component of the carbon enveloping layer is amorphous carbon, which will also affect the cycling performance of the secondary battery.

In some embodiments, a proportion of the first carbon-based material being the secondary particles in the first carbon-based material by number is ≥65%, for example, ≥67.5%, ≥70%, ≥72.5%, or ≥75%. In high-energy-density battery systems, the first region of the negative electrode film layer often has a relatively low porosity and more difficult ion liquid phase transport. By including an appropriate proportion of secondary particles in the first carbon-based material, the pore structure of the first region of the negative electrode film layer can be improved, reducing the difficulty of ion liquid phase transmission and allowing ions to rapidly transfer to the particle surface. In addition, the first carbon-based material being the secondary particles can provide more ion intercalation channels, thereby facilitating the rapid diffusion of ions from the particle surface to the bulk phase. This helps further optimize the fast charge performance of the secondary battery.

The inventors further found that the proportion of the first carbon-based material being the secondary particles in the first carbon-based material by number should not be too high. In this case, the secondary battery has more side reactions, which will affect the cycling performance of the secondary battery. Optionally, in some embodiments, a proportion of the first carbon-based material being the secondary particles in the first carbon-based material by number may be 65% to 95%, 70% to 95%, 75% to 95%, 65% to 90%, 70% to 90%, 75% to 90%, 65% to 85%, 70% to 85%, or 75% to 85%. This is beneficial for the secondary battery to have both good fast charge performance and good cycling performance.

In some embodiments, the first carbon-based material may also include primary particles (referring to particles in a non-agglomerated state herein), and a proportion of the first carbon-based material being the primary particles in the first carbon-based material by number may be ≤35%.

In some embodiments, the first carbon-based material has no carbon enveloping layer on its surface, the first carbon-based material includes secondary particles formed by aggregation of primary particles, and a proportion of the first carbon-based material of secondary particles in the first carbon-based material by number is ≥65%. In high energy density battery systems, in a case that the first carbon-based material particles including the secondary particles has a carbon enveloping layer on its surface, a difference between the compacted densities of the second region and the first region of the negative electrode film layer is relatively small, and the matching between the pore distribution and the ion concentration distribution in a thickness direction of the negative electrode film layer becomes poorer, thus resulting in less effect on the improvement of the fast charge performance of the secondary battery.

In some embodiments, a particle size by volume $D_v50$ of the first carbon-based material may be 12 μm to 18 μm, and, in some embodiments, 14 μm to 16 μm. With the particle size by volume $D_v50$ of the first carbon-based material falling within the foregoing range, it is favorable to improve the transport performance of ions and electrons, thereby further improving the fast charge performance of the secondary battery. In addition, it can also reduce the specific surface area of the first carbon-based material and reduce side reactions, thereby further improving the cycling performance of the secondary battery.

The inventors further found that when the first carbon-based material further meets one or more of the following conditions on the basis of the above-mentioned design, the performance of the secondary battery can be further improved. For example, the energy density, cycling performance, or fast charge performance of the secondary battery is further improved.

In some embodiments, a particle size by volume $D_v90$ of the first carbon-based material may be 24 μm to 30 μm, and, in some embodiments, 25 μm to 29 μm. With the particle size by volume $D_v90$ of the first carbon-based material falling within the foregoing range, the first carbon-based material particles have good consistency, which is conducive to improving the transport performance of ions and electrons, thereby further improving the fast charge performance of the secondary battery.

In some embodiments, the first carbon-based material meets $(D_v90-D_v10)/D_v50$ being 0.8 to 1.6, and, in some embodiments, being 1.0 to 1.3. With $(D_v90-D_v10)/D_v50$ of the first carbon-based material falling within the foregoing range, it is favorable for the first region of the negative electrode film layer to have a suitable pore structure, thereby reducing the difficulty of ion liquid phase transport and further improving the fast charge performance of the secondary battery; and in addition, the first carbon-based material also has good particle stacking performance, which helps increase the compacted density of the negative electrode film layer, thereby further increasing the energy density of the secondary battery.

In some embodiments, a specific surface area of the first carbon-based material may be 2.0 $m^2/g$ to 4.0 $m^2/g$, and, in some embodiments, 2.5 $m^2/g$ to 3.1 $m^2/g$. With the specific surface area of the first carbon-based material falling within the foregoing range, the ion intercalation channels in the first region of the negative electrode film layer can be increased, which is favorable for the rapid diffusion of ions from the particle surface to the bulk phase, thereby further optimizing the fast charge performance of the secondary battery. In addition, with the specific surface area of the first carbon-based material falling within the foregoing range, it is conducive to reducing side reactions, thereby also enabling the secondary battery to have good cycling performance.

In some embodiments, a powder compacted density of the first carbon-based material under 20000 N may be 1.8 $g/cm^3$ to 2.0 $g/cm^3$, and, in some embodiments, 1.85 $g/cm^3$ to 1.95 $g/cm^3$. With the powder compacted density of the first carbon-based material falling within the foregoing range, the compacted density of the negative electrode film layer can be increased, thereby further increasing the energy density of the secondary battery; and it is also favorable for the first region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In some embodiments, a tap density of the first carbon-based material may be 0.9 g/cm³ to 1.1 g/cm³, and, in some embodiments, 0.95 g/cm³ to 1.05 g/cm³. With the tap density of the first carbon-based material falling within the foregoing range, the compacted density of the negative electrode film layer can be increased, thereby further increasing the energy density of the secondary battery; and it is also favorable for the first region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In some embodiments, a degree of graphitization of the first carbon-based material may be ≥93%, and, in some embodiments, 93% to 95%. With the degree of graphitization of the first carbon-based material falling within the foregoing range, it helps improve the ion transport performance of the negative electrode film layer, so that the secondary battery can have both high energy density and good fast charge performance.

In some embodiments, a gram volume of the first carbon-based material may be ≥355 mAh/g, and, in some embodiments, 357 mAh/g to 364 mAh/g. With the gram volume of the first carbon-based material falling within the foregoing range, the energy density of the secondary battery can be increased, and the first carbon-based material can also be enabled to have good ion transport performance, which also helps improve the fast charge performance of the secondary battery.

In some embodiments, a powder OI value of the first carbon-based material may be 3 to 10, and, in some embodiments, 5 to 8. The first carbon-based material has a relatively small powder OI value, so can quickly receive ions from the positive electrode, thereby further improving the fast charge performance of the secondary battery.

In some embodiments, the particle size by volume $D_v50$ of the first carbon-based material is denoted as A in m, the specific surface area of the first carbon-based material is denoted as B in m²/g, and A/B is 4 to 11, and, in some embodiments, 5 to 7. By adjusting A/B within the foregoing range, the ion intercalation channels in the negative electrode film layer can be increased, which is favorable for the rapid diffusion of ions from the particle surface to the bulk phase, thereby further optimizing the fast charge performance of the secondary battery. In addition, it is also conducive to reducing side reactions, thereby also enabling the secondary battery to have good cycling performance.

In some embodiments, the first carbon-based material may include graphite, and, in some embodiments, the graphite includes artificial graphite.

In some embodiments, the first carbon-based material may include graphite being secondary particles. Optionally, a proportion of the graphite being the secondary particles in the first carbon-based material by number is ≥65%, for example, ≥67.5%, ≥70%, ≥72.5%, or ≥75%. In an example, a proportion of the graphite being the secondary particles in the first carbon-based material by number may be 65% to 95%, 70% to 95%, 75% to 95%, 65% to 90%, 70% to 90%, 75% to 90%, 65% to 85%, 70% to 85%, or 75% to 85%.

In some embodiments, a proportion of the first carbon-based material in the first active material by mass may be ≥50%, and, in some embodiments, 60% to 98%, 70% to 98%, 80% to 98%, 85% to 98%, 60% to 97%, 70% to 97%, 80% to 97%, or 85% to 97%. By adjusting the proportion of the first carbon-based material within the foregoing range, the electronic conductivity of the negative electrode film layer can be improved, thereby improving the fast charge performance of the secondary battery while also achieving good cycling performance of the secondary battery.

The second region 1022 includes a second active material different from the first active material.

In some embodiments, the second active material includes second carbon-based material.

In some embodiments, the second carbon-based material may include secondary particles formed by aggregation of primary particles. In a case that the second carbon-based material includes secondary particles, it is favorable for ions to be quickly transported to the particle surface. In addition, the second carbon-based material being the secondary particles can provide more ion intercalation channels, thereby facilitating the rapid diffusion of ions from the surface layer of the particles to the bulk phase. In this way, in the case that the second carbon-based material includes secondary particles formed by aggregation of primary particles, it helps further improve the fast charge performance of the secondary battery and helps achieve the goal of ultra fast charge.

In some embodiments, the first active material includes a first carbon-based material, the second active material includes a second carbon-based material, the first carbon-based material includes secondary particles formed by aggregation of primary particles, the second carbon-based material includes secondary particles formed by aggregation of primary particles, and the proportion of the second carbon-based material being the secondary particles in the second carbon-based material by number is less than the proportion of the first carbon-based material being the secondary particles in the first carbon-based material by number. Usually, the second region of the negative electrode film layer has a relatively high porosity and is less difficulty of ion liquid phase transport than the first region. By adjusting the proportion of the second carbon-based material being the secondary particles in the second carbon-based material by number to be less than the proportion of the first carbon-based material being the secondary particles in the first carbon-based material by number, it helps reduce side reactions and improve the cycling performance of the secondary battery.

In some embodiments, the first active material includes a first carbon-based material, the second active material includes a second carbon-based material, and a particle size by volume $D_v50$ of the second carbon-based material may be less than a particle size by volume $D_v50$ of the first carbon-based material. By controlling the particle size by volume $D_v50$ of the second carbon-based material to be less than the particle size by volume $D_v50$ of the first carbon-based material, the second region and the first region of the negative electrode film layer can have an ideal compacted density difference, so that the pore distribution in the thickness direction of the negative electrode film layer better matches the ion concentration distribution, which helps improve the wettability and retention characteristics of the negative electrode film layer with respect to the electrolyte solution and is favorable for ion transport, thereby enabling the secondary battery to have both good fast charge performance and cycling performance.

In some embodiments, the first active material includes a first carbon-based material, the second active material includes a second carbon-based material, and a specific surface area of the second carbon-based material may be less than a specific surface area of the first carbon-based material. By controlling the specific surface area of the second carbon-based material to be less than the specific surface area of the first carbon-based material, it helps reduce side reactions, thereby enabling the secondary battery to have both good fast charge performance and cycling performance.

In some embodiments, the first active material includes a first carbon-based material, the second active material includes a second carbon-based material, a powder compacted density of the second carbon-based material under 20000 N may be less than a powder compacted density of the first carbon-based material under 20000 N; By controlling the powder compacted density of the second carbon-based material at 20000 N to be less than the powder compacted density of the first carbon-based material at 20000 N, the second region and the first region of the negative electrode film layer can have a good pore distribution that better matches the concentration distribution of ions in the thickness direction of the negative electrode film layer, which reduces the difficulty of ion liquid phase transport and improves the wettability and retention characteristics of the negative electrode film layer with respect to the electrolyte solution, thereby enabling the secondary battery to have both good fast charge performance and cycling performance.

In some embodiments, the first active material includes a first carbon-based material, the second active material includes a second carbon-based material, and a tap density of the second carbon-based material may be greater than a tap density of the first carbon-based material. By controlling the tap density of the second carbon-based material to be greater than the tap density of the first carbon-based material, the second region of the negative electrode film layer can have both good fast charge performance and high energy density.

In some embodiments, the first active material includes a first carbon-based material, the second active material includes a second carbon-based material, and a degree of graphitization of the second carbon-based material may be less than a degree of graphitization of the first carbon-based material. The second carbon-based material has a relatively small degree of graphitization, so its interlayer spacing is relatively large, which is conducive to the rapid deintercalation of ions; and the first carbon-based material has a relatively high degree of graphitization, so its gram volume is relatively high. Therefore, by adjusting the degree of graphitization of the second carbon-based material to be lower than the degree of graphitization of the first carbon-based material, it is favorable for the secondary battery to have both high energy density and good fast charge performance.

In some embodiments, the first active material includes a first carbon-based material, the second active material includes a second carbon-based material, and a gram volume of the second carbon-based material may be less than a gram volume of the first carbon-based material. By adjusting the gram volume of the second carbon-based material to be less than the gram volume of the first carbon-based material, it is favorable for the secondary battery to have both high energy density and good fast charge performance.

In some embodiments, the first active material includes a first carbon-based material, the second active material includes a second carbon-based material, and a powder OI value of the second carbon-based material may be less than a powder OI value of the first carbon-based material. The second carbon-based material has a relatively small powder OI value, and the particles have ion intercalation ports in all directions, so that ions from the positive electrode can be quickly received. By adjusting the powder OI value of the second carbon-based material to be less than the powder OI value of the first carbon-based material, it is favorable for rapid deintercalation of ions, thereby enabling the secondary battery to have better fast charge performance.

The inventors further found that when the second carbon-based material meets one or more of the following conditions on the basis of the above-mentioned design, the performance of the secondary battery can be further improved, for example, the energy density, cycling performance, or fast charge performance of the secondary battery is further improved.

In some embodiments, a proportion of the second carbon-based material being the secondary particles in the second carbon-based material by number is ≥60%, for example, ≥62.5%, ≥65%, ≥67.5%, or ≥70%. When the second carbon-based material includes an appropriate proportion of secondary particles, it helps further improve the fast charge performance of the secondary battery and helps achieve the goal of ultra fast charge.

The inventors further found that the proportion of the second carbon-based material being the secondary particles in the second carbon-based material by number should not be too high. In this case, the secondary battery has more side reactions, which will affect the cycling performance of the secondary battery. Optionally, in some embodiments, the proportion of the second carbon-based material being the secondary particles in the second carbon-based material by number may be 60% to 90%, 60% to 85%, 60% to 80%, 60% to 75%, 65% to 90%, 65% to 85%, 65% to 80%, 65% to 75%, 70% to 90%, 70% to 85%, 70% to 80%, or 70% to 75%. This is favorable for the secondary battery to better have both good fast charge performance and good cycling performance.

In some embodiments, the second carbon-based material may also include primary particles (referring to particles in a non-agglomerated state herein), and a proportion of the second carbon-based material being the primary particles in the second carbon-based material by number may be ≤40%.

In some embodiments, the second carbon-based material may have a carbon enveloping layer on its surface. The second carbon-based material is located in a surface layer portion of the negative electrode film layer. In this case, the presence of the carbon enveloping layer may increase the ion diffusion channels, which helps further optimize the fast charge performance of the secondary battery.

In some embodiments, more than 80% of the surface of the second carbon-based material is covered with a carbon enveloping layer, and, in some embodiments, 90% to 100% of the surface of the second carbon-based material is covered with a carbon enveloping layer.

In some embodiments, the second carbon-based material may have a carbon enveloping layer on its surface, and the carbon enveloping layer includes hard carbon. Hard carbon has the advantage of large interlayer spacing, which may accelerate the ion diffusion rate, thereby further optimizing the fast charge performance of the secondary battery.

The carbon enveloping layer on the surface of the second carbon-based material may be formed by carbonizing an organic carbon source. The organic carbon source may be a carbon-containing material suitable for enveloping, as known in the art, for example, one or more of coal pitch, petroleum pitch, phenolic resin, and coconut shell.

In some embodiments, a particle size by volume $D_v50$ of the second carbon-based material may be 10 μm to 17 μm, and, in some embodiments, 13 μm to 15 μm.

In some embodiments, a particle size by volume $D_v90$ of the second carbon-based material may be 18 μm to 26 μm, and, in some embodiments, 21 μm to 25 μm.

With the particle size by volume $D_v50$ and/or $D_v90$ of the second carbon-based material falling within the foregoing range(s), it helps improve the transport performance of ions and electrons, thereby further improving the fast charge performance of the secondary battery.

In some embodiments, the second carbon-based material meets $(D_v90-D_v10)/D_v50$ being 0.6 to 1.4, and, in some embodiments, being 0.8 to 1.2. With $(D_v90-D_v10)/D_v50$ of the second carbon-based material falling within the foregoing range, it is favorable for the second region of the negative electrode film layer to have a suitable pore structure, thereby reducing the difficulty of ion liquid phase transport and further improving the fast charge performance of the secondary battery; and in addition, the second carbon-based material also has good particle stacking performance, which helps increase the compacted density of the negative electrode film layer, thereby further increasing the energy density of the secondary battery.

In some embodiments, a specific surface area of the second carbon-based material is 1.5 m$^2$/g to 3.0 m$^2$/g, and, in some embodiments, 1.8 m$^2$/g to 2.5 m$^2$/g. With the specific surface area of the second carbon-based material falling within the foregoing range, the ion intercalation channels in the negative electrode film layer can be increased, which is favorable for the rapid diffusion of ions from the particle surface to the bulk phase, thereby further optimizing the fast charge performance of the secondary battery. In addition, with the specific surface area of the second carbon-based material falling within the foregoing range, it is conducive to reducing side reactions, thereby also enabling the secondary battery to have better cycling performance.

In some embodiments, a powder compacted density of the second carbon-based material under 20000 N is 1.65 g/cm$^3$ to 1.85 g/cm$^3$, and, in some embodiments, 1.70 g/cm$^3$ to 1.80 g/cm$^3$. With the powder compacted density of the second carbon-based material falling within the foregoing range, the compacted density of the negative electrode film layer can be increased, thereby further increasing the energy density of the secondary battery; and it is also favorable for the second region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In some embodiments, a tap density of the second carbon-based material is 1.0 g/cm$^3$ to 1.2 g/cm$^3$, and, in some embodiments, 1.05 g/cm$^3$ to 1.15 g/cm$^3$. With the tap density of the second carbon-based material falling within the foregoing range, the compacted density of the negative electrode film layer can be increased, thereby further increasing the energy density of the secondary battery; and it is also favorable for the second region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In some embodiments, a degree of graphitization of the second carbon-based material may be ≥91%, and, in some embodiments, 92% to 94%. With the degree of graphitization of the second carbon-based material falling within the foregoing range, it helps improve the ion transport performance of the negative electrode film layer, so that the secondary battery can have both high energy density and good fast charge performance.

In some embodiments, a gram volume of the second carbon-based material may be ≥352 mAh/g, and, in some embodiments, 355 mAh/g to 359 mAh/g. With the gram volume of the second carbon-based material falling within the foregoing range, the energy density of the secondary battery can be increased, and the second carbon-based material can also be enabled to have good ion transport performance, which also helps improve the fast charge performance of the secondary battery.

In some embodiments, a powder OI value of the second carbon-based material may be 2 to 8, and, in some embodiments, 3 to 6. The second carbon-based material has a relatively small powder OI value, so can quickly receive ions from the positive electrode, thereby further improving the fast charge performance of the secondary battery.

In some embodiments, the particle size by volume $D_v50$ of the second carbon-based material is denoted as C in m, the specific surface area of the second carbon-based material is denoted as D in m$^2$/g, and C/D is 3 to 9, and, in some embodiments, 4 to 6. By adjusting C/D within the foregoing range, the ion intercalation channels in the negative electrode film layer can be increased, which is favorable for the rapid diffusion of ions from the surface of the second carbon-based material particles to the bulk phase, thereby further optimizing the fast charge performance of the secondary battery. In addition, it is also conducive to reducing side reactions, thereby also enabling the secondary battery to have better cycling performance.

In some embodiments, the second carbon-based material may include graphite, and, in some embodiments, the graphite includes artificial graphite.

In some embodiments, the second carbon-based material may include artificial graphite being secondary particles. Optionally, the proportion of the artificial graphite being the secondary particles in the second carbon-based material by number may be ≥60%, for example, ≥62.5%, ≥65%, ≥67.5%, or ≥70%. In an example, the proportion of the artificial graphite being the secondary particles in the second carbon-based material by number may be 60% to 90%, 60% to 85%, 60% to 80%, 60% to 75%, 65% to 90%, 65% to 85%, 65% to 80%, 65% to 75%, 70% to 90%, 70% to 85%, 70% to 80%, or 70% to 75%.

In some embodiments, the second carbon-based material may include artificial graphite being the secondary particles, and the artificial graphite has a carbon enveloping layer on its surface.

In some embodiments, a proportion of the second carbon-based material in the second active material by mass may be ≥70%, and, in some embodiments, 70% to 100%, 75% to 100%, 80% to 100%, 85% to 100%, 70% to 95%, 75% to 95%, 80% to 95%, or 85% to 95%. This helps improve the fast charge performance of the secondary battery.

In some embodiments, a proportion of the second carbon-based material in the second active material by mass may be 100%.

In some embodiments, the second active material may include a second silicon-based material in addition to the second carbon-based material, which can further increase the energy density of the secondary battery.

In some embodiments, the second silicon-based material may include one or more of primary particles and secondary particles formed by aggregation of primary particles, and, in some embodiments, includes primary particles.

In some embodiments, the second silicon-based material includes primary particles, and a proportion of the second silicon-based material being the primary particles in the second silicon-based material by number may be ≥60%, and, in some embodiments, 65% to 95%. When the second silicon-based material is mainly primary particles, it helps reduce the probability of particle breakage and increase the compacted density of the negative electrode film layer, thereby further increasing the energy density of the secondary battery.

In some embodiments, the second silicon-based material may further include secondary particles, and a proportion of the second silicon-based material being the secondary particles in the second silicon-based material by number may be ≤40%. The specific types of the second silicon-based material being the primary particles and the second silicon-based material being the secondary particles may be the same or may be different.

In some embodiments, a proportion of the second silicon-based material in the second active material by mass may be less than a proportion of the first silicon-based material in the first active material by mass. The second silicon-based material is in direct contact with the electrolyte solution. By controlling the proportion of the second silicon-based material in the second active material by mass to be less than the proportion of the first silicon-based material in the first active material by mass, side reactions can be reduced, thereby facilitating the secondary battery to have better cycling performance.

In some embodiments, a particle size by volume $D_v50$ of the second silicon-based material may be less than a particle size by volume $D_v50$ of the first silicon-based material. During preparation of the negative electrode plate, the second silicon-based material is more affected by the pressure roller, making the particles more prone to breakage. By adjusting the particle size by volume $D_v50$ of the second silicon-based material to be less than the particle size by volume $D_v50$ of the first silicon-based material, the probability of particle breakage of the second silicon-based material can be reduced, the electronic conductivity of the second silicon-based material can be increased, and the ion intercalation channel of the negative electrode film layer can be increased, thereby enabling the secondary battery to have both high energy density and good fast charge performance.

In some embodiments, a specific surface area of the second silicon-based material may be less than a specific surface area of the first silicon-based material. When the specific surface area of the second silicon-based material is less than the specific surface area of the first silicon-based material, it helps reduce side reactions, thereby facilitating the secondary battery to have better cycling performance.

In some embodiments, a powder compacted density of the second silicon-based material under 50000 N may be greater than a powder compacted density of the first silicon-based material under 50000 N. By adjusting the powder compacted density of the second silicon-based material to be greater than the powder compacted density of the first silicon-based material, it helps increase the energy density of the secondary battery and improve the cycling performance of the secondary battery.

In some embodiments, a tap density of the second silicon-based material may be greater than a tap density of the first silicon-based material. By adjusting the tap density of the second silicon-based material to be greater than the tap density of the first silicon-based material, it helps increase the energy density of the secondary battery and improve the cycling performance of the secondary battery.

In some embodiments, a powder resistivity of the second silicon-based material under 4 MPa may be less than a powder resistivity of the first silicon-based material under 4 MPa. By adjusting the powder resistivity of the second silicon-based material to be less than the powder resistivity of the first silicon-based material, it helps improve the electronic conductivity of the negative electrode film layer, thereby further improving the fast charge performance of the secondary battery.

The inventors further found that when the second silicon-based material meets one or more of the following conditions on the basis of the above-mentioned design, the performance of the secondary battery can be further improved, for example, the energy density, cycling performance, or fast charge performance of the secondary battery is further improved.

In some embodiments, a particle size by volume $D_v50$ of the second silicon-based material may be 4 μm to 12 μm, and, in some embodiments, 5 μm to 11 μm.

In some embodiments, a particle size by volume $D_v90$ of the second silicon-based material may be 8 μm to 18 μm, and, in some embodiments, 9 μm to 17 μm.

With the particle size by volume $D_v50$ and/or $D_v90$ of the second silicon-based material falling within the foregoing range(s), the ion intercalation channels in the negative electrode film layer can be increased, which is favorable for the rapid diffusion of ions from the particle surface to the bulk phase, thereby further optimizing the fast charge performance of the secondary battery. In addition, the risk of breakage of the second silicon-based material particles can also be reduced.

In some embodiments, the second silicon-based material meets $(D_v90-D_v10)/D_v50$ being 0.7 to 1.3, and, in some embodiments, being 0.8 to 1.2. With $(D_v90-D_v10)/D_v50$ of the second silicon-based material falling within the foregoing range, it is favorable for the second region of the negative electrode film layer to have a suitable pore structure, thereby reducing the difficulty of ion liquid phase transport and further improving the fast charge performance of the secondary battery; and in addition, the second silicon-based material may also have good particle stacking performance, which helps increase the compacted density of the negative electrode film layer, thereby further increasing the energy density of the secondary battery.

In some embodiments, a specific surface area of the second silicon-based material may be 0.6 m$^2$/g to 1.6 m$^2$/g, and, in some embodiments, 0.7 m$^2$/g to 1.5 m$^2$/g. With the specific surface area of the second silicon-based material falling within the foregoing range, the ion intercalation channels of the negative electrode film layer can be increased, which is favorable for the rapid diffusion of ions from the particle surface to the bulk phase, thereby further optimizing the fast charge performance of the secondary battery. In addition, with the specific surface area of the second silicon-based material falling within the foregoing range, it is conducive to reducing side reactions, thereby also enabling the secondary battery to have better cycling performance.

In some embodiments, a powder compacted density of the second silicon-based material under 50000 N is 1.2 g/cm³ to 1.8 g/cm³, and, in some embodiments, 1.3 g/cm³ to 1.7 g/cm³. With the powder compacted density of the second silicon-based material falling within the foregoing range, the compacted density of the negative electrode film layer can be increased, thereby further increasing the energy density of the secondary battery; and it is also favorable for the second region of the negative electrode film layer to have a suitable pore structure, which reduces the difficulty of ion liquid phase transport, improves transport performance of ions and electrons, and improves the wettability and retention characteristics of the negative electrode film layer with respect to the electrolyte solution, thereby further improving the fast charge performance and/or cycling performance of the secondary battery.

In some embodiments, a tap density of the second silicon-based material may be 1.1 g/cm³ to 1.7 g/cm³, and, in some embodiments, 1.2 g/cm³ to 1.6 g/cm³. With the tap density of the second silicon-based material falling within the foregoing range, the compacted density of the negative electrode film layer can be increased, thereby increasing the energy density of the secondary battery; and it is also favorable for the second region of the negative electrode film layer to have a suitable pore structure, which can further reduce the difficulty of ion liquid phase transport, improve transport performance of ions and electrons, and improve the wettability and retention characteristics of the negative electrode film layer with respect to the electrolyte solution, thereby further improving the fast charge performance and/or cycling performance of the secondary battery.

In some embodiments, a powder resistivity of the second silicon-based material under 4 MPa may be ≤5 Ω·cm, and, in some embodiments, 0.3 Ω·cm to 4 Ω·cm. By adjusting the powder resistivity of the second silicon-based material within the foregoing range, the electronic conductivity of the negative electrode film layer can be improved, and the fast charge performance of the secondary battery can be further improved.

In some embodiments, a proportion of the second silicon-based material in the second active material by mass may be ≤30%, and, in some embodiments, ≤20%, ≤15%, or ≤10%. By adjusting the proportion of the second silicon-based material within the foregoing range, the secondary battery can have improved fast charge performance and increased energy density, and the secondary battery can also have good cycling performance.

In some embodiments, the second silicon-based material may include one or more of elemental silicon, silicon oxide ($SiO_x$, $0<x\leq2$), silicon-carbon material, and silicon alloy material. The silicon-carbon material is not specifically limited to any structure in this application. For example, high-energy ball milling may be used to disperse nano-silicon in a carbon material, disperse nano-silicon in porous carbon, disperse a carbon material in porous silicon, envelop a carbon material on the surface of nano-silicon, co-deposit nano-silicon and nano-carbon together.

In some embodiments, the second silicon-based material may have a carbon enveloping layer on its surface. For example, the carbon enveloping layer may be arranged on the surface of elemental silicon, silicon oxide, or the like, to improve the electronic conductivity of the second silicon-based material and reduce the powder resistivity of the second silicon-based material. By adjusting parameters such as a thickness of the carbon enveloping layer and the degree of graphitization, the powder resistivity of the second silicon-based material can be adjusted.

Certainly, the surface of the second silicon-based material may alternatively have no carbon enveloping layer. For example, by adjusting parameters such as the structure of the silicon-carbon material and the percentage of element carbon, the powder resistivity of the second silicon-based material can be adjusted.

The carbon enveloping layer on the surface of the second silicon-based material may be formed through chemical vapor deposition, pyrolysis, hydrothermal method, and the like.

In some embodiments, the first active material includes a first silicon-based material and a first carbon-based material. The first silicon-based material includes secondary particles formed by aggregation of primary particles, and a proportion of the first silicon-based material being the secondary particles in the first silicon-based material by number is ≥55%, and, in some embodiments, 60% to 85%. The first carbon-based material has no carbon enveloping layer on its surface. The first carbon-based material includes secondary particles formed by aggregation of primary particles, and a proportion of the first carbon-based material being the secondary particles in the first carbon-based material by number is ≥65%, and, in some embodiments, 70% to 95%.

In some embodiments, the first active material includes a first silicon-based material and a first carbon-based material. The first silicon-based material includes secondary particles formed by aggregation of primary particles, and a proportion of the first silicon-based material being the secondary particles in the first silicon-based material by number is ≥55%, and, in some embodiments, 60% to 85%. The first carbon-based material has no carbon enveloping layer on its surface. The first carbon-based material includes secondary particles formed by aggregation of primary particles, and a proportion of the first carbon-based material being the secondary particles in the first carbon-based material by number is ≥65%, and, in some embodiments, 70% to 95%. The second active material includes a second carbon-based material. The second carbon-based material includes secondary particles formed by aggregation of primary particles, and a proportion of the second carbon-based material being the secondary particles in the second carbon-based material by number is less than a proportion of the first carbon-based material being the secondary particles in the first carbon-based material by number.

In some embodiments, the first active material includes a first silicon-based material and a first carbon-based material. The first silicon-based material includes secondary particles formed by aggregation of primary particles, and a proportion of the first silicon-based material being the secondary particles in the first silicon-based material by number is ≥55%, and, in some embodiments, 60% to 85%. The first carbon-based material has no carbon enveloping layer on its surface. The first carbon-based material includes secondary particles formed by aggregation of primary particles, and a proportion of the first carbon-based material being the secondary particles in the first carbon-based material by number is ≥65%, and, in some embodiments, 70% to 95%. The second active material includes a second carbon-based material and a second silicon-based material. The second carbon-based material includes secondary particles formed by aggregation of primary particles, and a proportion of the second carbon-based material being the secondary particles in the second carbon-based material by number is less than a proportion of the first carbon-based material being the secondary particles in the first carbon-based material by number. The second silicon-based material includes primary particles, and a proportion of the second silicon-based material being the primary particles in the second silicon-based material by number is ≥60%, and, in some embodiments, 65% to 95%. A proportion of the second silicon-based material in the second active material by mass is less than a proportion of the first silicon-based material in the first active material by mass.

As shown in FIG. 1 to FIG. 3, the negative electrode film layer 102 further includes an intermediate region 1023 located between the first region 1021 of the negative electrode film layer and the second region 1022 of the negative electrode film layer and having a thickness of 0.4H (where H represents a thickness of the negative electrode film layer 102).

In some embodiments, the intermediate region 1023 includes the first active material and/or the second active material. For example, as shown in FIG. 2, the intermediate region 1023 may be the same as the first region 1021 in composition. Thus, a distribution region of the first active material in the thickness direction of the negative electrode film layer 102 is within a thickness range from a second surface 102b of the negative electrode film layer to 0.7H. Alternatively, as shown in FIG. 3, the intermediate region 1023 may be the same as the second region 1022 in composition. Thus, a distribution region of the second active material in the thickness direction of the negative electrode film layer 102 is within a thickness range from a first surface 102a of the negative electrode film layer to 0.7H. Alternatively, as shown in FIG. 1, the intermediate region 1023 includes both the first active material and the second active material. In this case, the intermediate region 1023 includes both a layer structure having the first active material and a layer structure having the second active material, and the two-layer structures may further have a layer interface.

In some embodiments, the first region 1021 of the negative electrode film layer may also include other negative electrode active materials known in the art in addition to the first carbon-based material and the first silicon-based material, for example, may also include one or more of tin-based material and lithium titanate.

In some embodiments, the second region 1022 of the negative electrode film layer may also include other negative electrode active materials known in the art in addition to the second carbon-based material and the second silicon-based material, for example, may also include one or more of tin-based material and lithium titanate.

In some embodiments, the intermediate region 1023 of the negative electrode film layer may also include one or more of tin-based material and lithium titanate.

In some embodiments, the first region, the second region, and the intermediate region of the negative electrode film layer may, in some embodiments, include a negative electrode conductive agent and/or a negative electrode binder.

The negative electrode conductive agent is not limited to a particular type in this application. For example, the negative electrode conductive agent may include one or more of superconducting carbon, conductive graphite, acetylene black, carbon black, Ketjen black, carbon dots, carbon nanotubes, graphene, and carbon nanofiber.

The negative electrode binder is not limited to a particular type in this application. For example, the negative electrode binder may include one or more of styrene-butadiene rubber (SBR), water-soluble unsaturated resin SR-1B, waterborne acrylic resin (for example, polyacrylic acid PAA, polymethylacrylic acid PMAA, and polyacrylic acid sodium PAAS), polyacrylamide (PAM), polyvinyl alcohol (PVA), sodium alginate (SA), and carboxymethyl chitosan (CMCS).

In some embodiments, the first region, the second region, and the intermediate region of the negative electrode film layer may, in some embodiments, include other additives. For example, the another additive may include a thickener, for example, sodium carboxymethyl cellulose (CMC) or PTC thermistor material.

In some embodiments, a porosity of the negative electrode film layer may be ≥18%, and, in some embodiments, 25% to 45%. This helps the negative electrode film layer to have both high capacity and suitable pore structure, which in turn helps the secondary battery to have both high energy density and good cycling performance and fast charge performance.

In some embodiments, a compacted density of the negative electrode film layer may be ≥1.5 g/cm$^3$, and, in some embodiments, 1.6 g/cm$^3$ to 1.8 g/cm$^3$. This helps the negative electrode film layer to have both high capacity and good ion and electron transport performance, which in turn helps the secondary battery to have both high energy density and good cycling performance and fast charge performance.

In some embodiments, a surface density of the negative electrode film layer may be ≥7 mg/cm$^2$, and, in some embodiments, 12 mg/cm$^2$ to 30 mg/cm$^2$. This helps the negative electrode film layer to have both high capacity and good ion and electron transport performance, which in turn helps the secondary battery to have both high energy density and good cycling performance and fast charge performance.

In some embodiments, the negative electrode current collector may be a metal foil current collector or a composite current collector. For example, a copper foil may be used as the metal foil. The composite current collector may include a polymer material matrix and a metal layer formed on at least one surface of the polymer material matrix. For example, the metal material may include one or more of copper, copper alloy, nickel, nickel alloy, titanium, titanium alloy, silver, and silver alloy. For example, the polymer material matrix may include one or more of polypropylene (PP), polyethylene terephthalate (PET), polybutylene terephthalate (PBT), polystyrene (PS), and polyethylene (PE).

The negative electrode plate does not exclude additional functional layers other than the negative electrode film layer. For example, in some embodiments, the negative electrode plate of this application further includes a conductive primer layer (for example, consisting of a conductive agent and a binder) sandwiched between the negative electrode current collector and the negative electrode film layer and arranged on the surface of the negative electrode current collector. In some embodiments, the negative electrode plate of this application further includes a protective layer covering the surface of the negative electrode film layer.

The negative electrode current collector includes two opposite surfaces in its thickness direction, and the negative electrode film layer is arranged on either or both of the two opposite surfaces of the negative electrode current collector. It should be noted that the various parameters of the negative electrode film layer given in this application (for example, compacted density, surface density, and porosity) are parameters of the negative electrode film layer on one side of the negative electrode current collector. When the negative electrode film layer is arranged on two sides of the negative electrode current collector, parameters of the negative electrode film layer on any one side meet this application, that is, are considered to fall within the protection scope of this application.

The presence of a carbon enveloping layer on a surface of the material (for example, the first carbon-based material, second carbon-based material, first silicon-based material, and second silicon-based material) may be determined by transmission electron microscope.

The primary particle and the secondary particle both have meanings well known in the art. The primary particle refers to a non-agglomerated particle. The secondary particle is a particle in an agglomerated state that are formed through aggregation from two or more primary particles. The primary particle and the secondary particle may be distinguished using scanning electron microscope (SEM) images.

The particle sizes by volume $D_v10$, $D_v50$, and $D_v90$ of the material (for example, the first carbon-based material, second carbon-based material, first silicon-based material, and second silicon-based material) have meanings well-known in the art, represent the particle sizes corresponding to the cumulative volume distribution percentages of 10%, 50%, and 90%, respectively, and may be tested using an instrument and a method known in the art. For example, the particle size by volume may be determined using a laser particle size analyzer in accordance with GB/T 19077-2016. The test instrument may be a Mastersizer 3000 laser particle size analyzer from Malvern Instruments in UK.

The specific surface area of the material (for example, the first carbon-based material, second carbon-based material, first silicon-based material, and second silicon-based material) has a meaning well known in the art, and may be tested using an instrument and a method known in the art. For example, the specific surface area may be tested according to GB/T 19587-2017 using the nitrogen adsorption specific surface area analysis test method and calculated using the BET (Brunauer Emmett Teller) method. The test instrument may be a specific surface area and pore size analyzer of Tri-Star 3020 from Micromeritics of USA.

The powder compacted density of the material (for example, the first carbon-based material, second carbon-based material, first silicon-based material, and second silicon-based material) has a meaning well known in the art, and may be tested using an instrument and a method known in the art. For example, it can be tested in accordance with the standard GB/T 24533-2009 by using an electronic pressure testing machine (for example, electronic pressure testing machine of model UTM7305). An example test method is as follows: weighing 1 g of sample powder and adding it to a mold with a base area of 1.327 cm², applying pressure to the required level and holding the pressure for 30 s, next releasing the pressure and holding for 10 s, and then recording the data and calculating the powder compacted density of the material under the required pressure.

The tap density of the material (for example, the first carbon-based material, second carbon-based material, first silicon-based material, and second silicon-based material) has a meaning well known in the art, and may be tested using an instrument and a method known in the art. For example, the tap density may be tested in accordance with GB/T 5162-2006 using a powder tap density tester. The test instrument may be Dandong Bettersize BT-301, with the test parameters as follows: 250±15 times/min, amplitude: 3±0.2 mm, vibration frequency: 5000 times, and measuring cylinder: 25 mL.

The degree of graphitization of the material (for example, the first carbon-based material and second carbon-based material) has a meaning well known in the art, and may be tested using an instrument and a method known in the art. For example, an X-ray diffractometer (for example, Bruker D8 Discover) may be used for testing. The testing may be carried out in accordance with JIS K 0131-1996 and JB/T 4220-2011 to obtain an average interlayer spacing $d_{002}$ of C(002) crystal plane in the crystal structure of the material, and then the degree of graphitization is calculated according to the formula, $g=(0.344-d_{002})/(0.344-0.3354)\times100\%$. In the foregoing formula, $d_{002}$ is the average interlayer spacing of the C(002) crystal plane in the crystal structure of the material, expressed in nanometers (nm).

The powder OI value of the material (for example, the first carbon-based material and second carbon-based material) has a meaning well known in the art, and may be tested using an instrument and a method known in the art. For example, an X-ray diffractometer (for example, Bruker D8 Discover) may be used for testing. The testing may be carried out in accordance with JIS K 0131-1996 and JB/T 4220-2011 to obtain an X-ray diffraction pattern of the powder sample, and then the powder OI value of the sample is calculated according to OI value=$I_{004}/I_{110}$. $I_{004}$ is the integrated area of the diffraction peak of the crystalline carbon 004 crystal plane in the powder sample, and $I_{110}$ is the integrated area of the diffraction peak of the crystalline carbon 110 crystal plane in the powder sample. In the X-ray diffraction analysis test of this application, a copper target may be used as an anode target, a CuKα ray is used as a radiation source, a ray wavelength $\lambda=1.5418$ Å, a scanning angle 2θ is 20° to 80°, and a scanning rate is 4°/min.

The powder resistivity of the material (for example, the first silicon-based material and second silicon-based material) has a meaning well known in the art, and may be tested using an instrument and a method known in the art. For example, the powder resistivity may be tested using a resistivity tester (for example, ST2722 powder resistivity tester from Suzhou Jingge Electronics Co., Ltd.). During testing, 1 g of powder sample is taken and placed between the electrodes of the resistivity tester, an electronic press is used to apply constant pressure on the sample to the test pressure (for example, 4 MPa) and maintain at this pressure for 15 s to 25 s to obtain a sheet-shaped sample. The powder resistivity δ of the material is calculated according to the formula $\delta=(S\times R)/h$, in a unit of Ω·cm, where h is the height of the sheet-shaped sample, in cm; R is the resistance, in Ω; and S is the area of the sheet-shaped sample, in cm².

The gram volume of the material (for example, the first carbon-based material and second carbon-based material) has a meaning well known in the art, and may be tested using a method known in the art. The exemplary test method is as follows: the sample powder, a conductive agent carbon black (Super P), and a binder polyvinylidene fluoride (PVDF) are mixed in a mass ratio of 91.6:1.8:6.6 in a solvent N-methylpyrrolidone (NMP) to prepare a slurry; the prepared slurry is applied on a surface of a negative electrode current collector copper foil, and the copper foil coated with the slurry is dried in an oven for reserve use; ethylene carbonate (EC), ethyl methyl carbonate (EMC), and diethyl carbonate (DEC) are mixed in a volume ratio of 1:1:1 to prepare an organic solvent, and $LiPF_6$ is dissolved in the preceding organic solvent to prepare an electrolyte solution with a concentration of 1 mol/L; next, a metal lithium sheet served as a counter electrode, a polyethylene (PE) film served as a separator, and the foregoing electrolyte solution are assembled into a CR2430 button battery in an argon-protected glove box; and the obtained button battery is left standing for 12 h and discharged at a constant current of 0.05C to 0.005 V at 25° C., left standing for 10 minutes and then discharged at a constant current of 50 μA to 0.005 V, left standing for 10 minutes and discharged at a constant current of 10 μA to 0.005 V, and then charged at a constant current of 0.1C to 2 V; and the charging capacity is recorded. A ratio of the charging capacity to the sample mass is the gram volume of the corresponding material (for example, the first carbon-based material and second carbon-based material).

The surface density of the negative electrode film layer has a meaning well known in the art, and may be tested by using a method known in the art. For example, a negative electrode plate that has been coated on one side and has been cold pressed (for a negative electrode plate coated with the negative electrode film layer on two sides, the negative electrode film layer on any one side may be wiped off first) is taken, and is punched into small rounds with an area of $S_1$. The negative electrode plate is weighed and its weight is record as $M_1$. Then the negative electrode film layer of the weighed negative electrode plate is wiped off, the negative electrode collector is weighed, and an obtained weight is recorded as $M_0$. The surface density of the negative electrode plate=$(M_1-M_0)/S_1$.

The compacted density of the negative electrode film layer has a meaning well known in the art, and may be tested using a method known in the art. The compacted density of the negative electrode film layer=the surface density of the negative electrode film layer/a thickness of the negative electrode film layer. The thickness of the negative electrode film layer has a meaning well known in the art, and may be tested using a method known in the art, such as a micrometer (for example, Mitutoyo 293-100 model, with an accuracy of 0.1 μm).

The porosity of the negative electrode film layer has a meaning well known in the art, and may be tested using a method known in the art. An example test method is as follows: A single-side coated and cold-pressed negative electrode plate (for a negative electrode plate coated with the negative electrode film layer on two sides, the negative electrode film layer on any one side may be wiped off first) is taken and punched into small round samples. An apparent volume $V_1$ of the negative electrode plate is calculated. In accordance with GB/T 24586-2009, with an inert gas (such as helium or nitrogen) served as the medium, a true volume $V_2$ of the negative electrode plate is tested using a true density tester through a gas displacement method. The porosity of the negative electrode film layer=$(V_1-V_2)/V_1\times 100\%$. A plurality of (for example, 30) negative electrode plate samples with good appearance and no edge flaking may be taken for the test, and results are averaged, thereby improving accuracy of a test result. The test instrument may be a true density tester of model AccuPyc II 1340 from Micromeritics.

The porosity of the first silicon-based material being the secondary particles may be tested using a method known in the art. For example, the true density $\rho_r$ of the first silicon-based material being the secondary particles may be tested using a true density tester (for example, AccuPyc II 1340). Specifically, the steps may include: weighing a sample of a certain mass (denoted as m), placing it in a true density tester, making the test system be airtight, and introducing helium according to the procedure; detecting the gas pressure in the sample chamber and the expansion chamber, and then calculating the true volume $V_r$ of the first silicon-based material being the secondary particles according to the Boyle's law (PV=nRT); and then obtaining the true density $\rho_r$ of the first silicon-based material being the secondary particles as $\rho_r=m/V_r$. The apparent density of the first silicon-based material being the secondary particles may be obtained through the following steps: loading a certain mass (denoted as m) of the sample into a cylindrical mold with an inner diameter of 10 mm, applying a pressure of 200 MPa to obtain the apparent volume $V_0$ of the first silicon-based material being the secondary particles, and then obtaining the apparent density $\rho_0$ of the first silicon-based material being the secondary particles as $\rho_0=m/V_0$. The porosity of the first silicon-based material being the secondary particles is denoted as P, thus P=$(1-\rho_0/\rho_r)\times 100\%$.

It should be noted that the tests for various parameters of the first active material, second active material, or negative electrode film layer mentioned above may be conducted by sampling and testing from the prepared secondary battery according to the following steps.

Discharging the secondary battery (for sake of safety, generally making the secondary battery in fully discharged state), disassembling the secondary battery, taking out the negative electrode plate, and using dimethyl carbonate to soak the negative electrode plate for a specific time (for example, 2 h to 10 h); and taking out the negative electrode plate and drying it at a given temperature for a specific time (for example, 60° C., for more than 4 h), and taking out the negative electrode plate obtained after drying. In this case, the samples from the dried negative electrode plate may be tested for parameters related to the negative electrode film layer described above, for example, surface density, compacted density, and porosity.

The dried negative electrode plate is baked at a certain temperature and time (for example, 400° C.° C., for more than 2 h). A region of the baked negative electrode plate is randomly selected for sampling the second active material first (sampling may be done by scraping powder with a blade), with the sampling position being the second region of the negative electrode film layer. Then, the first active material is sampled in the same manner, and the sampling position is the first region of the negative electrode film layer. The collected first active material and second active material are sieved respectively (for example, sieved with a 200-mesh sieve). Finally, the first active material and second active material samples that can be used for testing the parameters of the above-mentioned materials of this application are obtained.

In an example, a method for measuring the proportion of the first silicon-based material being the secondary particles in the first silicon-based material by number may be as follows: laying and sticking the first active material on a conductive adhesive to make a sample under test of 6 cm×1.1 cm; and using a scanning electron microscope to measure the particle morphology in accordance with JY/T010-1996. To ensure accuracy of the test results, a plurality of (for example, 10) different regions in samples under test may be randomly selected for scanning test, and with a specified magnification (for example, 500 times or 1000 times), a ratio of the number of first silicon-based material being the secondary particles to a total number of the first silicon-based material particles in each of the test regions is calculated. An average of the calculated results of the plurality of test regions is taken as the test result. To ensure accuracy of the test results, a plurality of (for example, 5 or 10) test samples may also be prepared to repeat the foregoing test, and an average of the test samples is taken as a final test result. Similarly, the proportion of the first carbon-based material being the secondary particles in the first carbon-based material by number may also be tested.

In an example, a method for measuring the proportion of the second carbon-based material being the secondary particles in the second carbon-based material by number may be as follows: laying and sticking the second active material on a conductive adhesive to make a sample under test of 6 cm×1.1 cm; and using a scanning electron microscope to measure the particle morphology in accordance with JY/T010-1996. To ensure accuracy of the test results, a plurality of (for example, 10) different regions in samples under test may be randomly selected for scanning test, and with a specified magnification (for example, 500 times or 1000 times), a ratio of the number of second carbon-based material being the secondary particles to a total number of the second carbon-based material particles in each of the test regions is calculated. An average of the calculated results of the plurality of test regions is taken as the test result. To ensure accuracy of the test results, a plurality of (for example, 5 or 10) test samples may also be prepared to repeat the foregoing test, and an average of the test samples is taken as a final test result. Similarly, the proportion of the second silicon-based material being the primary particles in the second silicon-based material by number may also be tested.

The proportions of primary particles (referring to non-agglomerated particles herein) and secondary particles in the carbon-based material (for example, the first carbon-based material or the second carbon-based material) by number may be adjusted using a method known in the art. For example, when the carbon-based material is graphite, the proportions of primary particles and secondary particles by number may be adjusted by adjusting the preparation parameters (for example, type of coke raw material, shaping process, granulation process, type and amount of granulating agent). Alternatively, the proportions of the primary particles and the secondary particles by number may be adjusted by adjusting a mixing ratio of the graphite primary particles to the graphite secondary particles.

The proportions of primary particles (referring to non-agglomerated particles herein) and secondary particles in the silicon-based material (for example, the first silicon-based material or the second silicon-based material) by number may be adjusted using similar methods. For example, the proportions of primary particles and secondary particles by number may be adjusted by adjusting the preparation parameters (for example, type of raw material, granulation process, type and amount of granulating agent). Alternatively, the proportions of the primary particles and the secondary particles by number may be adjusted by adjusting a mixing ratio of the silicon-based material being the primary particles to the silicon-based material being the secondary particles.

[Preparation Method of Negative Electrode Plate]

This application further provides a method for preparing the negative electrode plate of this application. The method includes the following steps: providing a first slurry containing a first active material and a second slurry containing a second active material; applying the first slurry on a negative electrode current collector, applying the second slurry on the first slurry, and drying and cold pressing the negative electrode current collector coated with the first slurry and the second slurry to obtain a negative electrode plate.

In some embodiments, the first active material, a conductive agent, a binder, and other auxiliary agents may be dispersed in a solvent (for example, deionized water) to form the first slurry.

In some embodiments, the second active material, a conductive agent, a binder, and other auxiliary agents may be dispersed in a solvent (for example, deionized water) to form the second slurry.

In some embodiments, the first active material may include a first silicon-based material, or a mixture of a first silicon-based material and a first carbon-based material.

In some embodiments, the second active material may include the second carbon-based material, or a mixture of the second carbon-based material and the second silicon-based material.

The first slurry and the second slurry may be applied simultaneously or applied separately in two times. In some embodiments, the first slurry and the second slurry are applied simultaneously. Simultaneous application can reduce the resistance of the negative electrode film layer, thereby further improving the fast charge performance and cycling performance of the secondary battery.

The application weight of the first slurry and the second slurry may be adjusted based on actual conditions.

The first active material, second active material, and the like mentioned above may be commercially obtained or prepared using the following methods in this application.

In some embodiments, a silicon-based material being the secondary particles may be prepared using the following method: preparing a solution containing primary particles, binder, and solvent, and performing spray drying on the solution to obtain the silicon-based material being the secondary particles. The binder is not specifically limited, and specific examples thereof may include one or more of asphalt, starch, phenolic resin, polyvinyl alcohol, epoxy resin, perchlorovinyl resin, and butyl rubber. The solvent is not specifically limited provided that it allows the primary particles to be fully dispersed. Specific examples of the solvent may include one or more of water, alcohols, N-methylpyrrolidone (NMP), dimethyl sulfoxide, acetonitrile, acetone, tetrahydrofuran, ether, toluene, and 1,2-dichlorobenzene. The temperature for spray drying may range from 100° C. to 250° C.

Alternatively, the silicon-based material being the secondary particles may be prepared by mixing the primary particles with a binder and granulating them, then performing heat treatment to obtain the silicon-based material being the secondary particles. The binder is not specifically limited, and specific examples thereof may include one or more of asphalt, starch, phenolic resin, polyvinyl alcohol, epoxy resin, perchlorovinyl resin, and butyl rubber.

The aggregation conditions may be adjusted so that the porosity of the silicon-based material being the secondary particles is within a suitable range. Specifically, the secondary particles may be immersed in a high-temperature molten filler, pressurized to control the degree of filler filling, and then subjected to high-temperature carbonization to adjust the porosity. A specific example of the filler may include one or more of asphalt, starch, phenolic resin, polyvinyl alcohol, epoxy resin, perchlorovinyl resin, butyl rubber, and polymethyl methacrylate.

During preparing the silicon-based material being the secondary particles, the types of primary particles used may be the same or different.

In some embodiments, a carbon-based material being the primary particles may be prepared using the following method: crushing and shaping a coke raw material, and performing graphitization treatment to obtain the carbon-based material being the primary particles. A specific example of the coke raw material may include one or more of petroleum coke, needle coke, pitch coke, and metallurgical coke. The graphitization temperature may range from 2800° C. to 3200° C.

In some embodiments, a carbon-based material being the secondary particles may be prepared using the following method: crushing and shaping a coke raw material, mixing the material with a binder for granulation, and performing graphitization treatment to obtain the carbon-based material being the secondary particles. A specific example of the coke raw material may include one or more of petroleum coke, needle coke, pitch coke, and metallurgical coke. The graphitization temperature may range from 2800° C. to 3200° C. A specific example of the binder may include asphalt.

The above preparation process does not include the step of forming a carbon enveloping layer on a surface of the material. In an example, the carbon enveloping layer on the surface of the carbon-based material may be formed by carbonizing an organic carbon source. The organic carbon source may be a carbon-containing material suitable for enveloping, as known in the art, for example, one or more of coal pitch, petroleum pitch, phenolic resin, and coconut shell. The carbon enveloping layer on the surface of the silicon-based material may be formed through chemical vapor deposition, pyrolysis, hydrothermal method, and the like.

[Positive Electrode Plate]

In some embodiments, the positive electrode plate includes a positive electrode current collector and a positive electrode film layer arranged on at least one surface of the positive electrode current collector. For example, the positive electrode current collector has two opposite surfaces in its thickness direction, and the positive electrode film layer is arranged on either or both of the two opposite surfaces of the positive electrode current collector.

The positive electrode current collector may be a metal foil current collector or a composite current collector. For example, an aluminum foil may be used as the metal foil. The composite current collector may include a polymer material matrix and a metal layer formed on at least one surface of the polymer material matrix. For example, the metal material may include one or more of aluminum, aluminum alloy, nickel, nickel alloy, titanium, titanium alloy, silver, and silver alloy. For example, the polymer material matrix may include one or more of polypropylene (PP), polyethylene terephthalate (PET), polybutylene terephthalate (PBT), polystyrene (PS), and polyethylene (PE).

The positive electrode film layer typically includes a positive electrode active material, a binder, and a conductive agent. The positive electrode film layer is typically formed by applying a positive electrode slurry onto the positive electrode current collector, followed by drying and cold pressing. The positive electrode slurry is typically formed by dispersing the positive electrode active material, the conductive agent, the binder, and any other components in a solvent and stirring them to uniformity. The solvent may be but is not limited to N-methylpyrrolidone (NMP). For example, the binder for the positive electrode film layer may include one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin. For example, the conductive agent used for the positive electrode film layer includes one or more of superconducting carbon, conductive graphite, acetylene black, carbon black, Ketjen black, carbon dots, carbon nanotubes, graphene, and carbon nanofiber.

The positive electrode active material may be a positive electrode active material for secondary batteries well known in the art.

When the secondary battery of this application is a lithium-ion battery, the positive electrode active material used for the lithium-ion battery may include but is not limited to one or more of lithium transition metal oxide, lithium-containing phosphate, and respective modified compounds thereof. Examples of the lithium transition metal oxide may include but are not limited to one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and respective modified compounds thereof. Examples of the lithium-containing phosphate may include but are not limited to one or more of lithium iron phosphate, a composite material of lithium iron phosphate and carbon, lithium manganese phosphate, a composite material of lithium manganese phosphate and carbon, lithium manganese iron phosphate, a composite material of lithium manganese iron phosphate and carbon, and respective modified compounds thereof.

In some embodiments, to further increase energy density of the secondary battery, the positive electrode active material used for the lithium-ion battery may include one or more of lithium transition metal oxide with a general formula $Li_aNi_bCo_cM_dO_eA_f$ and modified compounds thereof, where $0.8 \leq a \leq 1.2$, $0.5 \leq b < 1$, $0 < c < 1$, $0 < d < 1$, $1 \leq e \leq 2$, $0 \leq f \leq 1$, M is selected from one or more of Mn, Al, Zr, Zn, Cu, Cr, Mg, Fe, V, Ti, and B, and A is selected from one or more of N, F, S, and Cl.

In some embodiments, for example, the positive electrode active material used for the lithium-ion battery may include one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.5}Co_{0.1}Mn_{0.1}O_2$ (NCM811), $LiNi_{0.85}Co_{0.15}Al_{0.05}O_2$, $LiFePO_4$, and $LiMnPO_4$.

The foregoing modified compounds of the positive electrode active material may be obtained through doping modification and/or surface coating modification on the positive electrode active material.

[Electrolyte]

In some embodiments, the electrolyte is an electrolyte solution, and the electrolyte solution includes an electrolytic salt and a solvent.

The electrolytic salt is not limited to a specific type, and may be selected based on actual needs.

When the secondary battery of this application is a lithium-ion battery, for example, the electrolytic salt may include one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethane)sulfonimide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro bis(oxalato) phosphate (LiDFOP), and lithium tetrafluoro oxalato phosphate (LiTFOP).

The solvent is not limited to a specific type, and may be selected based on actual needs. In some embodiments, for example, the solvent may include one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), gamma-butyrolactone (GBL), sulfolane (SF), methyl sulfonyl methane (MSM), ethyl methanesulfonate (EMS), and diethyl sulfone (ESE).

In some embodiments, the electrolyte solution further, in some embodiments, includes an additive. For example, the additive may include a negative electrode film-forming additive, or may include a positive electrode film-forming additive, or may include an additive capable of improving some performance of the secondary battery, for example, an additive for improving overcharge performance of the secondary battery, an additive for improving high-temperature performance of the secondary battery, or an additive for improving low-temperature power performance of the secondary battery.

[Separator]

The separator is not limited to a particular type in this application, and may be any well-known porous separator with good chemical stability and mechanical stability.

In some embodiments, the separator may be made of one or more of glass fiber, non-woven fabric, polyethylene, polypropylene, and polyvinylidene fluoride. The separator may be a single-layer film or a multi-layer composite film. When the separator is a multi-layer composite film, all layers may be made of the same or different materials.

In some embodiments, the positive electrode plate, the separator, and the negative electrode plate may be made into an electrode assembly through winding or lamination.

In some embodiments, the secondary battery may include an outer package. The outer package may be used for packaging the foregoing electrode assembly and electrolyte.

In some embodiments, the outer package may be a hard shell, for example, a hard plastic shell, an aluminum shell, or a steel shell. The outer package may alternatively be a soft package, for example, a soft bag. Material of the soft package may be plastic, for example, one or more of polypropylene (PP), polybutylene terephthalate (PBT), and polybutylene succinate (PBS).

Figure 4:
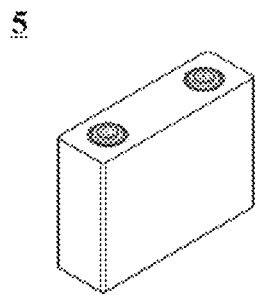
FIG. 4 is a schematic diagram of an embodiment of a secondary battery according to this application.

The shape of the secondary battery is not specifically limited in this application, and the secondary battery may be cylindrical, rectangular, or of any other shape. FIG. 4 shows a rectangular secondary battery 5 as an example.

Figure 5:
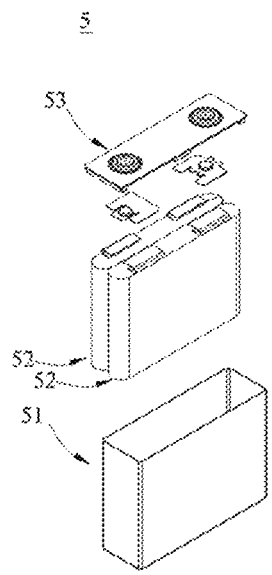
FIG. 5 is a schematic exploded view of an embodiment of a secondary battery in this application.

In some embodiments, as shown in FIG. 5, the outer package may include a housing 51 and a cover plate 53. The housing 51 may include a base plate and a side plate connected to the base plate, and the base plate and the side plate enclose an accommodating cavity. The housing 51 has an opening communicating with the accommodating cavity, and the cover plate 53 is configured to cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte solution infiltrates the electrode assembly 52. The secondary battery 5 may include one or more electrode assemblies 52 whose quantity is adjustable as required.

The preparation method of secondary battery of this application is well known. In some embodiments, the positive electrode plate, the separator, the negative electrode plate, and the electrolyte solution may be assembled to form a secondary battery. For example, the positive electrode plate, the separator, and the negative electrode plate may be made into an electrode assembly through winding or lamination; and the electrode assembly is placed into an outer package, followed by drying, and the electrolyte solution is injected, followed by processes such as vacuum packaging, standing, formation, and shaping, to obtain the secondary battery.

In some embodiments, such secondary batteries of this application may be assembled into a battery module. The battery module may include a plurality of secondary batteries, and a specific quantity may be adjusted based on application and capacity of the battery module.

Figure 6:
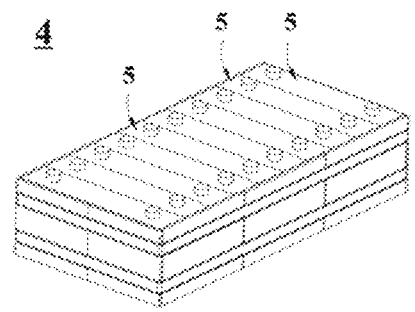
FIG. 6 is a schematic diagram of an embodiment of a battery module in this application.

FIG. 6 is a schematic diagram of a battery module 4 as an example. As shown in FIG. 6, in the battery module 4, a plurality of secondary batteries 5 may be sequentially arranged along a length direction of the battery module 4. Certainly, the batteries may alternatively be arranged in any other manners. Further, the plurality of secondary batteries 5 may be fastened using fasteners.

Optionally, the battery module 4 may further include a housing with an accommodating space, and the plurality of secondary batteries 5 are accommodated in the accommodating space.

In some embodiments, the battery modules may be further assembled into a battery pack, and a quantity of battery modules included in the battery pack may be adjusted based on application and capacity of the battery pack.

Figure 7:
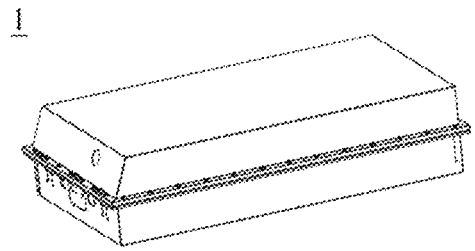
FIG. 7 is a schematic diagram of an embodiment of a battery pack in this application.
Figure 8:
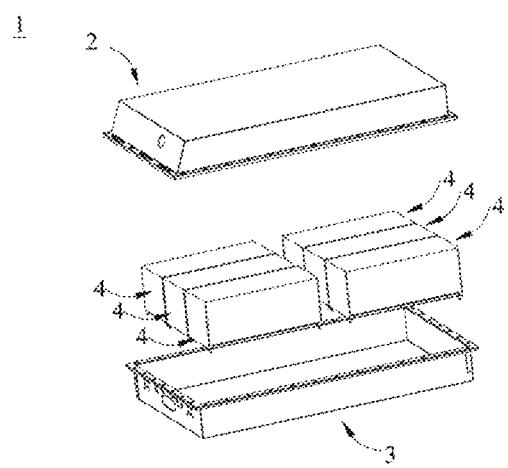
FIG. 8 is a schematic exploded view of the embodiment of the battery pack shown in FIG. 7.

FIG. 7 and FIG. 8 are schematic diagrams of a battery pack 1 as an example. As shown in FIG. 7 and FIG. 8, the battery pack 1 may include a battery box and a plurality of battery modules 4 arranged in the battery box. The battery box includes an upper box body 2 and a lower box body 3. The upper box body 2 is configured to be engaged with the lower box body 3 to form an enclosed space for accommodating the battery modules 4. The plurality of battery modules 4 may be arranged in the battery box in any manner.

An embodiment of this application further provides an electric apparatus. The electric apparatus includes at least one of the secondary battery, the battery module, or the battery pack in this application. The secondary battery, battery module, or battery pack may be used as a power source for the electric apparatus or an energy storage unit of the electric apparatus. The electric apparatus may be but is not limited to a mobile device (for example, a mobile phone, a tablet computer, or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, and an energy storage system.

The secondary battery, the battery module, or the battery pack may be selected for the electric apparatus based on requirements for using the electric apparatus.

Figure 9:
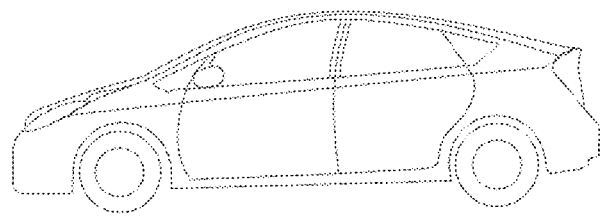
FIG. 9 is a schematic diagram of an embodiment of an electric apparatus using a secondary battery in this application as a power source.

FIG. 9 is a schematic diagram of an electric apparatus as an example. This electric apparatus is a battery electric vehicle, a hybrid electric vehicle, a plug-in hybrid electric vehicle, or the like. To satisfy requirements of the electric apparatus for high power and high energy density, a battery pack or a battery module may be used.

In another example, the electric apparatus may be a mobile phone, a tablet computer, a notebook computer, or the like. Such electric apparatus is generally required to be light and thin and may use a secondary battery as its power source.

EXAMPLES

Examples below more specifically describe the content disclosed in this application, and these embodiments are merely used for explanatory description. It is apparent for a person skilled in the art to make various modifications and variations within the scope of the content disclosed in this application. Unless otherwise stated, all parts, percentages, and ratios reported in the following examples are based on mass, all reagents used in the examples are commercially available or synthesized in a conventional manner, and can be used directly without further treatment, and all instruments used in the examples are commercially available. PThe first carbon-based material and the second carbon-based material of Comparative Example 1 were both primary particles, which could be commercially obtained or prepared using the following method: crushing and shaping the petroleum coke, then performing graphitization treatment in the range of 2800° C. to 3200° C., cooling to room temperature, and obtaining the product after sieving. PIn various examples, the first carbon-based material and the second carbon-based material might be commercially obtained, or might be prepared using the following method: crushing and shaping the petroleum coke, next mixing it with a binder asphalt and granulating them, then performing graphitization treatment in the range of 2800° C. to 3200° C., cooling to room temperature, and obtaining the product after sieving. The proportions of primary particles and secondary particles in the first carbon-based material (second carbon-based material) by number might be modified by adjusting the preparation process parameters (for example, shaping process, granulation process, type and amount of asphalt); or the proportions of primary particles and secondary particles by number might be adjusted by modifying a mixing ratio of the first carbon-based material (second carbon-based material) being the primary particles and the first carbon-based material (second carbon-based material) being the secondary particles. PIn the following examples and comparative examples, the carbon enveloping layers on the surfaces of the first carbon-based material and the second carbon-based material might be formed by mixing the graphitized material with petroleum pitch and then carbonizing the resulting mixture. PThe first silicon-based material and the second silicon-based material of Comparative Example 1 were both primary particles, and could be commercially obtained. PIn the following examples, the first silicon-based material (second silicon-based material) being the secondary particles might be commercially obtained or prepared using the following method: mixing the silicon-based material being the primary particles with a binder asphalt, and then performing heat treatment. The proportions of the primary particles and the secondary particles by number might be adjusted by modifying the preparation parameters (for example, granulation process, type and amount of asphalt); or the proportions of the primary particles and the secondary particles by number might be adjusted by modifying a mixing ratio of the silicon-based material (which could be commercially obtained) being the primary particles and the silicon-based material (which could be commercially obtained) being the secondary particles. PIn the following examples and comparative examples, the carbon enveloping layer on the surface of pre-intercalated lithium silicon oxide might be formed through chemical vapor deposition. PSecondary Batteries of Examples 1 to 17 and Comparative Example 1 were all Prepared According to the Following Method.

The first active material (as shown in Table 1), a conductive agent Super P, carbon nanotubes (CNTs), a binder styrene-butadiene rubber, and a thickener sodium carboxymethyl cellulose were mixed at a weight ratio of 96.2:0.7:0.1:1.8:1.2 in an appropriate amount of deionized water solvent, and the resulting mixture was stirred thoroughly to form a first slurry. The sum of the proportions of the secondary particles and the primary particles in the first carbon-based material by number was 100%, and the sum of the proportions of the secondary particles and the primary particles in the first silicon-based material by number was 100%. Therefore, the proportion of the secondary particles or the primary particles by number might be calculated based on the proportion of the primary particles or the secondary particles by number in Table 1.

The second active material (as shown in Table 2), a conductive agent Super P, carbon nanotubes (CNTs), a binder styrene-butadiene rubber, and a thickener sodium carboxymethyl cellulose were mixed at a weight ratio of 96.2:0.7:0.1:1.8:1.2 in an appropriate amount of deionized water solvent, and the resulting mixture was stirred thoroughly to form a second slurry. The sum of the proportions of the secondary particles and the primary particles in the second carbon-based material by number was 100%, and the sum of the proportions of the secondary particles and the primary particles in the second silicon-based material by number was 100%. Therefore, the proportion of the secondary particles or the primary particles by number might be calculated based on the proportion of the primary particles or the secondary particles by number in Table 2.

The first slurry and the second slurry were simultaneously extruded through a dual-chamber coating device. The first slurry was applied onto two surfaces of a negative electrode current collector copper foil, the second slurry was applied onto the first slurry, followed by drying and cold pressing, to obtain a negative electrode plate. The coating weights of the first slurry and second slurry were the same. A surface density of the negative electrode film layer on one side was 12.5 mg/cm$^2$, and a compacted density of the negative electrode film layer on one side was 1.80 g/cm$^3$.

$LiNi_{0.8}Co_{0.1}Mn_{0.1}O_2$(NCM811), a conductive agent Super P, and a binder polyvinylidene fluoride were mixed at a weight ratio of 96.5:1.5:2, an appropriate amount of NMP solvent was added in the mixture, and the resulting mixture at this point was stirred into uniformity to obtain a positive electrode slurry. The positive electrode slurry was applied onto two surfaces of positive electrode current collector aluminum foil, followed by drying and cold pressing, to obtain a positive electrode plate.

Ethylene carbonate (EC), ethyl methyl carbonate (EMC), and diethyl carbonate (DEC) were mixed at a volume ratio of 1:1:1 to obtain an organic solvent, and then $LiPF_6$ was dissolved in the organic solvent to prepare an electrolyte solution with a concentration of 1 mol/L.

A PP/PE composite film was used as a separator. The separator and the positive electrode plate and negative electrode plate prepared above were arranged in sequence so that the separator was located between the positive electrode plate and negative electrode plate to provide separation. Then the resulting stack was wound to obtain an electrode assembly. The electrode assembly was placed into an outer package and dried, and the electrolyte solution was then injected. Processes such as vacuum packaging, standing, formation, and aging were performed to obtain a secondary battery.

TABLE 1

| | First active material | | | | | | | | | | | |
|---|---|---|---|---|---|---|---|---|---|---|---|---|
| | First carbon-based material | | | | | | First silicon-based material | | | | | |
| No. | Type | Carbon enveloping layer | Proportion of secondary particles by number | $D_v 50$ (μm) | $D_v 90$ (μm) | Proportion by mass | Type | Carbon enveloping layer | Proportion of secondary particles by number | $D_v 50$ (μm) | $D_v 90$ (μm) | Proportion by mass |
| Example 1 | Artificial graphite | No | 86% | 15 | 26 | 75% | Pre-intercalated lithium silicon oxide | Yes | 70% | 11 | 22 | 25% |
| Example 2 | Artificial graphite | No | 86% | 15 | 26 | 75% | Pre-intercalated lithium silicon oxide | Yes | 80% | 11 | 22 | 25% |
| Example 3 | Artificial graphite | No | 86% | 15 | 26 | 75% | Pre-intercalated lithium silicon oxide | Yes | 85% | 11 | 22 | 25% |
| Example 4 | Artificial graphite | No | 86% | 15 | 26 | 75% | Pre-intercalated lithium silicon oxide | Yes | 60% | 11 | 22 | 25% |
| Example 5 | Artificial graphite | No | 86% | 15 | 26 | 75% | Pre-intercalated lithium silicon oxide | Yes | 50% | 11 | 22 | 25% |
| Example 6 | Artificial graphite | Yes | 86% | 15 | 26 | 75% | Pre-intercalated lithium silicon oxide | Yes | 70% | 11 | 22 | 25% |
| Example 7 | Artificial graphite | No | 95% | 15 | 26 | 75% | Pre-intercalated lithium silicon oxide | Yes | 70% | 11 | 22 | 25% |
| Example 8 | Artificial graphite | No | 70% | 15 | 26 | 75% | Pre-intercalated lithium silicon oxide | Yes | 70% | 11 | 22 | 25% |
| Example 9 | Artificial graphite | No | 65% | 15 | 26 | 75% | Pre-intercalated lithium silicon oxide | Yes | 70% | 11 | 22 | 25% |
| Example 10 | Artificial graphite | No | 30% | 15 | 26 | 75% | Pre-intercalated lithium silicon oxide | Yes | 70% | 11 | 22 | 25% |
| Example 11 | Artificial graphite | No | 86% | 15 | 26 | 75% | Pre-intercalated lithium silicon oxide | Yes | 70% | 11 | 22. | 25% |
| Example 12 | Artificial graphite | No | 86% | 15 | 26 | 75% | Pre-intercalated lithium silicon oxide | Yes | 70% | 11 | 22 | 25% |
| Example 13 | Artificial graphite | No | 86% | 15 | 26 | 75% | Pre-intercalated lithium silicon oxide | Yes | 70% | 11 | 22 | 25% |
| Example 14 | Artificial graphite | No | 86% | 15 | 26 | 75% | Pre-intercalated. lithium silicon oxide | Yes | 70% | 11 | 22 | 25% |
| Example 15 | Artificial graphite | No | 86% | 15 | 26 | 85% | Pre-intercalated lithium silicon oxide | Yes | 70% | 11 | 22 | 15% |
| Example 16 | Artificial graphite | No | 86% | 15 | 26 | 90% | Pre-intercalated lithium silicon oxide | Yes | 70% | 11 | 22 | 10% |
| Example 17 | Artificial graphite | No | 86% | 15 | 26 | 75% | Pre-intercalated lithium silicon oxide | Yes | 70% | 11 | 22 | 25% |
| Comparative Example 1 | Artificial graphite | Yes | 0% | 15 | 26 | 75% | Pre-intercalated lithium silicon oxide | Yes | 0% | 11 | 22 | 25% |

TABLE 2

| | | Second active material | | | | | | | | | |
|---|---|---|---|---|---|---|---|---|---|---|---|
| | | Second carbon-based material | | | | | Second silicon-based material | | | | |
| No. | Type | Carbon enveloping layer | Proportion of secondary particles by number | $D_v50$ (μm) | $D_v90$ (μm) | Proportion by mass | Type | Carbon enveloping layer | Proportion of primary particles by number | $D_v50$ (μm) | $D_v90$ (μm) | Proportion by mass |
| Example 1 | Artificial graphite | Yes | 75% | 14 | 21 | 90% | Pre-intercalated lithium silicon oxide | Yes | 70% | 11 | 22 | 10% |
| Example 2 | Artificial graphite | Yes | 75% | 14 | 21 | 90% | Pre-intercalated lithium silicon oxide | Yes | 70% | 11 | 22 | 10% |
| Example 3 | Artificial graphite | Yes | 75% | 14 | 21 | 90% | Pre-intercalated lithium silicon oxide | Yes | 70% | 11 | 22 | 10% |
| Example 4 | Artificial graphite | Yes | 75% | 14 | 21 | 90% | Pre-intercalated lithium silicon oxide | Yes | 70% | 11 | 22 | 10% |
| Example 5 | Artificial graphite | Yes | 75% | 14 | 21 | 90% | Pre-intercalated lithium silicon oxide | Yes | 70% | 11 | 22 | 10% |
| Example 6 | Artificial graphite | Yes | 75% | 14 | 21 | 90% | Pre-intercalated lithium silicon oxide | Yes | 70% | 11 | 22 | 10% |
| Example 7 | Artificial graphite | Yes | 85% | 14 | 21 | 90% | Pre-intercalated lithium silicon oxide | Yes | 70% | 11 | 22 | 10% |
| Example 8 | Artificial graphite | Yes | 65% | 14 | 21 | 90% | Pre-intercalated lithium silicon oxide | Yes | 70% | 11 | 22 | 10% |
| Example 9 | Artificial graphite | Yes | 60% | 14 | 21 | 90% | Pre-intercalated lithium silicon oxide | Yes | 70% | 11 | 22 | 10% |
| Example 10 | Artificial graphite | Yes | 50% | 14 | 21 | 90% | Pre-intercalated lithium silicon oxide | Yes | 70% | 11 | 22 | 10% |
| Example 11 | Artificial graphite | Yes | 65% | 14 | 21 | 90% | Pre-intercalated lithium silicon oxide | Yes | 70% | 11 | 22 | 10% |
| Example 12 | Artificial graphite | Yes | 90% | 14 | 21 | 90% | Pre-intercalated lithium silicon oxide | Yes | 70% | 11 | 22 | 10% |
| Example 13 | Artificial graphite | Yes | 75% | 14 | 21 | 90% | Pre-intercalated lithium silicon oxide | Yes | 60% | 11 | 22 | 10% |
| Example 14 | Artificial graphite | Yes | 75% | 14 | 21 | 90% | Pre-intercalated lithium silicon oxide | Yes | 20% | 11 | 22 | 10% |
| Example 15 | Artificial graphite | Yes | 75% | 14 | 21 | 90% | Pre-intercalated lithium silicon oxide | Yes | 70% | 11 | 22 | 10% |
| Example 16 | Artificial graphite | Yes | 75% | 14 | 21 | 75% | Pre-intercalated lithium silicon oxide | Yes | 70% | 11 | 22 | 25% |
| Example 17 | Artificial graphite | No | 75% | 14 | 21 | 90% | Pre-intercalated lithium silicon oxide | Yes | 70% | 11 | 22 | 10% |
| Comparative Example 1 | Artificial graphite | Yes | 0% | 14 | 21 | 90% | Pre-intercalated lithium silicon oxide | Yes | 100% | 11 | 22 | 10% |

Performance Test (1) Fast Charge Performance Test for Secondary Battery

At 25° C., the secondary battery was charged to 4.3 V at a constant current of 0.33C, then charged to a current of 0.05C at such constant voltage, and left standing for 5 min; and the secondary battery was discharged to 2.8 V at a constant current of 0.33C. The actual capacity was recorded as C0.

Then, the secondary battery was charged to full-battery charging cut-off voltage 4.3 V or 0 V negative cut-off potential (whichever came first) successively at a constant current of 1.0C0, 1.3C0, 1.5C0, 1.8C0, 2.0C0, 2.3C0, 2.5C0, and 3.0C0, and needed to be discharged to 2.8 V at 1C0 after each charge was completed. Corresponding negative potentials for charging to 10% SOC (State of Charge, state of charge), 20% SOC, 30% SOC, . . . , and 80% SOC at different charging rates were recorded, and charging rate-negative potential curves in different SOCs were drawn. Charging rates corresponding to the negative potential of 0 V in different SOCs were obtained through linear fitting, and the charging rates were charging windows in the SOCs and were denoted by C10% SOC, C20% SOC, C30% SOC, C40% SOC, C50% SOC, C60% SOC, C70% SOC, and C80% SOC. According to a formula (60/C20% SOC+60/C30% SOC+60/C40% SOC+60/C50% SOC+60/C60% SOC+60/C70% SOC+60/C80% SOC)×10%, a charging time T (min) for charging the secondary battery from 10% SOC to 80% SOC (under the premise of no lithium precipitation of the secondary battery) was obtained through calculation. A shorter charging time indicated better fast charge performance of the secondary battery.

(2) Cycling Performance Test for Secondary Battery

At 45° C., the above-prepared secondary battery was charged to 4.3 V at a constant current of 1C, then charged at a constant voltage to a current of 0.05C, and left standing for 5 min; and then the secondary battery was discharged the to 2.8 V at a constant current of 1C. The discharge capacity at this point was recorded, and it was the discharge capacity after the first cycle. The secondary battery was subjected to the charge and discharge cycling test according to the foregoing method, and a discharge capacity of each cycle was recorded. Capacity retention rate (%) of the secondary battery after 200 cycles at 45° C.=Discharge capacity after the 200-th cycle/Discharge capacity after the first cycle× 100%

TABLE 3

| No. | Fast charge time (min) | Capacity retention rate after 200 cycles at 45° C. |
|---|---|---|
| Example 1 | 20.0 | 96.00% |
| Example 2 | 19.0 | 95.20% |
| Example 3 | 18.5 | 94.90% |
| Example 4 | 21.5 | 96.50% |
| Example 5 | 23.7 | 92.10% |
| Example 6 | 20.2 | 93.50% |
| Example 7 | 18.3 | 95.30% |
| Example 8 | 20.9 | 96.20% |
| Example 9 | 21.4 | 96.50% |
| Example 10 | 24.1 | 91.50% |
| Example 11 | 20.6 | 96.80% |
| Example 12 | 20.1 | 94.20% |
| Example 13 | 19.0 | 95.10% |
| Example 14 | 21.2 | 90.70% |
| Example 15 | 21.2 | 96.70% |
| Example 16 | 20.7 | 91.10% |
| Example 17 | 23.2 | 97.10% |
| Comparative Example 1 | 30.0 | 90.00% |

It can be learned from the test results in Table 3 that the negative electrode plate of this application can enable high-energy-density batteries to have good fast charge performance and good cycling performance.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:

1. A secondary battery, comprising:
a negative electrode plate, comprising:
a negative electrode current collector; and
a negative electrode film layer, wherein
the negative electrode film layer has a first surface away from the negative electrode current collector and a second surface arranged opposite the first surface;
the negative electrode film layer has a thickness of H;
a first region of the negative electrode film layer comprises a first active material with a thickness range from the second surface of the negative electrode film layer to 0.3H, wherein the first active material comprises a first silicon-based material and a first carbon-based material, the first silicon-based material comprises secondary particles formed by aggregation of primary particles, the first carbon-based material comprises secondary particles formed by aggregation of the primary particles; and
a second region of the negative electrode film layer comprises a second active material with a thickness range from the first surface of the negative electrode film layer to 0.3H, the second active material comprises a second carbon-based material, the second carbon-based material comprises secondary particles formed by aggregation of primary particles, a proportion of the second carbon-based material being the secondary particles in the second carbon-based material by quantity is less than a proportion of the first carbon-based material being the secondary particles in the first carbon-based material by quantity.

2. The secondary battery according to claim 1, wherein the first silicon-based material is a pre-intercalated lithium silicon oxide, a proportion of the first silicon-based material being the secondary particles in the first silicon-based material by quantity is ≥55%.

3. The secondary battery according to claim 1, wherein the first carbon-based material has no carbon enveloping layer on its surface.

4. The secondary battery according to claim 1, wherein the first carbon-based material is graphite; and
the proportion of the first carbon-based material being the secondary particles in the first carbon-based material by quantity is ≥65%.

5. The secondary battery according to claim 1, wherein a particle size by volume $D_v50$ of the first carbon-based material is 12 μm to 18 μm.

6. The secondary battery according to claim 1, wherein the first carbon-based material meets at least one of the following:
a particle size by volume $D_v90$ of the first carbon-based material is 24 μm to 30 μm;
the first carbon-based material meets $(D_v90-D_v10)/D_v50$ being 0.8 to 1.6;
a specific surface area of the first carbon-based material is 2.0 m²/g to 4.0 m²/g;
a powder compacted density of the first carbon-based material under 20000 N is 1.8 g/cm³ to 2.0 g/cm³;
a tap density of the first carbon-based material is 0.9 g/cm³ to 1.1 g/cm³;
a degree of graphitization of the first carbon-based material is ≥93%;
a gram volume of the first carbon-based material is ≥355 mAh/g;
a powder OI value of the first carbon-based material is 3 to 10;

the particle size by volume $D_v50$ of the first carbon-based material is denoted as A in μm, the specific surface area of the first carbon-based material is denoted as B in $m^2/g$, and A/B is 4 to 11;

the first carbon-based material comprises artificial graphite; or a proportion of the first carbon-based material in the first active material by mass is ≥50%.

7. The secondary battery according to claim 1, wherein the first carbon-based material and the second carbon-based material meet at least one of the following:

a particle size by volume $D_v50$ of the second carbon-based material is less than a particle size by volume $D_v50$ of the first carbon-based material;

a specific surface area of the second carbon-based material is less than a specific surface area of the first carbon-based material;

a powder compacted density of the second carbon-based material under 20000 N is less than a powder compacted density of the first carbon-based material under 20000 N;

a tap density of the second carbon-based material is greater than a tap density of the first carbon-based material;

a degree of graphitization of the second carbon-based material is lower than a degree of graphitization of the first carbon-based material;

a gram volume of the second carbon-based material is less than a gram volume of the first carbon-based material; or a powder OI value of the second carbon-based material is less than a powder OI value of the first carbon-based material.

8. The secondary battery according to claim 1, wherein the second carbon-based material meets at least one of the following:

the proportion of the secondary particles in the second carbon-based material by quantity is ≥60%;

the second carbon-based material has a carbon enveloping layer on its surface, and the carbon enveloping layer comprises hard carbon;

a particle size by volume $D_v50$ of the second carbon-based material is 10 μm to 17 μm;

a particle size by volume $D_v90$ of the second carbon-based material is 18 μm to 26 μm;

the second carbon-based material meets $(D_v90-D_v10)/D_v50$ being 0.6 to 1.4;

a specific surface area of the second carbon-based material is 1.5 $m^2/g$ to 3.0 $m^2/g$;

a powder compacted density of the second carbon-based material under 20000 N is 1.65 $g/cm^3$ to 1.85 $g/cm^3$;

a tap density of the second carbon-based material is 1.0 $g/cm^3$ to 1.2 $g/cm^3$;

a degree of graphitization of the second carbon-based material is ≥91% a gram volume of the second carbon-based material is ≥352 mAh/g;

a powder OI value of the second carbon-based material is 2 to 8;

the particle size by volume $D_v50$ of the second carbon-based material is denoted as C in μm, the specific surface area of the second carbon-based material is denoted as D in $m^2/g$, and C/D is 3 to 9;

the second carbon-based material comprises graphite, or the second carbon-based material comprises artificial graphite; or a proportion of the second carbon-based material in the second active material by mass is ≥70%.

9. The secondary battery according to claim 1, wherein the first silicon-based material meets at least one of the following:

a porosity of the first silicon-based material being the secondary particles is ≥4%;

a particle size by volume $D_v50$ of the first silicon-based material is 8 μm to 15 μm;

a particle size by volume $D_v90$ of the first silicon-based material is 15 μm to 25 μm;

the first silicon-based material meets $(D_v90-D_v10)/D_v50$ being 0.7 to 1.5;

a specific surface area of the first silicon-based material is 0.7 $m^2/g$ to 2.0 $m^2/g$;

a powder compacted density of the first silicon-based material under 50000 N is 1.0 $g/cm^3$ to 1.7 $g/cm^3$;

a tap density of the first silicon-based material is 1.0 $g/cm^3$ to 1.5 $g/cm^3$;

a powder resistivity of the first silicon-based material under 4 MPa is ≤15 Ω·cm;

a proportion of the first silicon-based material in the first active material by mass is ≤50%;

the first silicon-based material further comprises at least one of:

elemental silicon;

silicon oxide;

silicon-carbon material; or silicon alloy material; or the first silicon-based material comprises secondary particles formed by aggregation of at least one of the following primary particles:

silicon oxide material primary particles containing neither alkali metal nor alkaline earth metal;

silicon oxide material primary particles containing either alkali metal or alkaline earth metal;

silicon-carbon material primary particles;

elemental silicon primary particles; or silicon alloy primary particles.

10. The secondary battery according to claim 1, wherein the second active material comprises a second silicon-based material; and the second silicon-based material comprises at least one of primary particles or secondary particles formed by aggregation of primary particles.

11. The secondary battery according to claim 1, wherein the second active material comprises a second silicon-based material;

the second silicon-based material comprises primary particles; and a proportion of the second silicon-based material being the primary particles in the second silicon-based material by quantity is ≥60%.

12. The secondary battery according to claim 1, wherein the second active material comprises a second silicon-based material; and a proportion of the second silicon-based material in the second active material by mass is less than a proportion of the first silicon-based material in the first active material by mass.

13. The secondary battery according to claim 1, wherein the second active material comprises a second silicon-based material; and the first silicon-based material and the second silicon-based material meet at least one of the following:
- a particle size by volume $D_v50$ of the second silicon-based material is less than a particle size by volume $D_v50$ of the first silicon-based material;
- a specific surface area of the second silicon-based material is less than a specific surface area of the first silicon-based material;
- a powder compacted density of the second silicon-based material under 50000 N is greater than a powder compacted density of the first silicon-based material under 50000 N;
- a tap density of the second silicon-based material is greater than a tap density of the first silicon-based material; or
- a powder resistivity of the second silicon-based material under 4 MPa is less than a powder resistivity of the first silicon-based material under 4 MPa.

14. The secondary battery according to claim 1, wherein the second active material comprises a second silicon-based material, and the second silicon-based material meets at least one of the following:
- a particle size by volume $D_v50$ of the second silicon-based material is 4 μm to 12 μm;
- a particle size by volume $D_v90$ of the second silicon-based material is 8 μm to 18 μm;
- the second silicon-based material meets $(D_v90-D_v10)/D_v50$ being 0.7 to 1.3;
- a specific surface area of the second silicon-based material is 0.6 m²/g to 1.6 m²/g;
- a powder compacted density of the second silicon-based material under 50000 N is 1.2 g/cm³ to 1.8 g/cm³;
- a tap density of the second silicon-based material is 1.1 g/cm³ to 1.7 g/cm³;
- a powder resistivity of the second silicon-based material under 4 MPa is ≤5 Ω·cm;
- a proportion of the second silicon-based material in the second active material by mass is ≤30%; or
- the second silicon-based material comprises one or more of elemental silicon, silicon oxide, silicon-carbon material, or silicon alloy material.

15. The secondary battery according to claim 1, wherein an intermediate region of the negative electrode film layer located between the first region and the second region comprises at least one of tin-based material and lithium titanate.

16. The secondary battery according to claim 1, wherein the negative electrode film layer meets at least one of the following:
- a porosity of the negative electrode film layer is ≥18%;
- a compacted density of the negative electrode film layer is ≥1.5 g/cm³; or
- a surface density of the negative electrode film layer is ≥7 mg/cm².

17. An electric apparatus, comprising:
a secondary battery, the secondary battery comprising:
  a negative electrode plate, comprising:
    a negative electrode current collector; and
    a negative electrode film layer, wherein
    the negative electrode film layer has a first surface away from the negative electrode current collector and a second surface arranged opposite the first surface;
    the negative electrode film layer has a thickness of H;
    a first region of the negative electrode film layer comprises a first active material with a thickness range from the second surface of the negative electrode film layer to 0.3H, wherein the first active material comprises a first silicon-based material, the first silicon-based material comprises secondary particles formed by aggregation of primary particles, the first carbon-based material comprises secondary particles formed by aggregation of the primary particles; and
    a second region of the negative electrode film layer comprises a second active material with a thickness range from the first surface of the negative electrode film layer to 0.3H, the second active material comprises a second carbon-based material, the second carbon-based material comprises secondary particles formed by aggregation of primary particles, a proportion of the second carbon-based material being the secondary particles in the second carbon-based material by quantity is less than a proportion of the first carbon-based material being the secondary particles in the first carbon-based material by quantity.

18. The electric apparatus according to claim 17, wherein the first silicon-based material is a pre-intercalated lithium silicon oxide, a proportion of the first silicon-based material being the secondary particles in the first silicon-based material by quantity is ≥55%.

19. The electric apparatus according to claim 17, wherein the first carbon-based material has no carbon enveloping layer on its surface.

* * * * *